US007076097B2

(12) United States Patent
Kondo et al.

(10) Patent No.: US 7,076,097 B2
(45) Date of Patent: Jul. 11, 2006

(54) IMAGE PROCESSING APPARATUS AND METHOD, COMMUNICATION APPARATUS, COMMUNICATION SYSTEM AND METHOD, AND RECORDED MEDIUM

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 10/048,103

(22) PCT Filed: May 23, 2001

(86) PCT No.: PCT/JP01/04331

§ 371 (c)(1),
(2), (4) Date: May 31, 2002

(87) PCT Pub. No.: WO01/93591

PCT Pub. Date: Dec. 6, 2001

(65) Prior Publication Data

US 2002/0172421 A1 Nov. 21, 2002

(30) Foreign Application Priority Data

May 29, 2000 (JP) ............................. 2000-159281

(51) Int. Cl.
*G06K 9/46* (2006.01)
*G06K 9/34* (2006.01)
*G06K 9/36* (2006.01)

(52) U.S. Cl. ....................................... 382/190; 382/173
(58) Field of Classification Search ................ 382/164, 382/173, 190, 195, 199, 284, 305; 358/462, 358/444, 449; 707/3; 713/151
See application file for complete search history.

(56) References Cited

U.S. PATENT DOCUMENTS 5,680,226 A * 10/1997 Takayanagi ................. 358/462

(Continued)

FOREIGN PATENT DOCUMENTS

| JP | 7-222145 | 8/1995 |
| JP | 8-79757 | 3/1996 |
| JP | 11-164305 | 6/1999 |

OTHER PUBLICATIONS

Salembier, et al., "Segmentation-Based Video Coding System Allowing the Manipulation of Objects," IEEE Transactions on Circuits and Systems for Video Technology, vol. 7, No. 1, Feb. 1997, pp. 60-74.

(Continued)

*Primary Examiner*—Amir Alavi
(74) *Attorney, Agent, or Firm*—Frommer Lawrence & Haug LLP; William S. Frommer; Thomas F. Presson

(57) ABSTRACT

The present invention provides an image processing apparatus and method destined for processing image data sent via a communication system. In the apparatus and method, image data corresponding to designation data supplied from the user are coupled to each other for grouping, features of the image data corresponding to the designation data, and the image data once coupled together as in the above are uncoupled according to the features of the grouped image data, to thereby accurately localize an area the user is interested in. Also, according to the present invention, a time interval between the designation data is computed, and the image data are coupled to each other when the computed time interval is less than a predetermined threshold, while they are not coupled to each other when the computed time interval exceeds the predetermined threshold, thereby detecting when the user's interest shifts to another image area. With this detection of the shift of the user's interest, it is possible to accurately localize an area the user is interested in.

18 Claims, 15 Drawing Sheets

U.S. PATENT DOCUMENTS

| | | | | |
|---|---|---|---|---|
| 5,966,462 | A | * | 10/1999 | Linder et al. ............... 382/173 |
| 6,021,221 | A | * | 2/2000 | Takaha ...................... 382/199 |
| 6,467,039 | B1 | * | 10/2002 | Fredriksson ................ 713/151 |
| 6,510,243 | B1 | * | 1/2003 | Ikeda ......................... 382/173 |
| 6,532,461 | B1 | * | 3/2003 | Evans ........................... 707/3 |
| 6,862,367 | B1 | * | 3/2005 | Granlund .................... 382/195 |
| 2002/0172421 | A1 | * | 11/2002 | Kondo et al. ............... 382/173 |

OTHER PUBLICATIONS

Moon, et al., "Boundary Block-Merging (BBM) Technique for Efficient Texture Coding of Arbitrarily Shaped Object," IEEE Transactions on Circuits and Systems for Video Technology, vol. 9, No. 1, Feb. 1999, pp. 35-43.

Guo, et al., "Fast Video Object Segmentation Using Affine Motion and Gradient-Based Color Clustering," IEEE Second Workshop on Multimedia Signal Processing, Dec., 7-9, 1998, pp. 486-491.

Sakaida, et al., "An Image Segmentation Method by the Region Integration Using the Initial Dependence of the Clustering Algorithm," NHK Giken R&D, No. 53, Nov. 1998, pp. 42-56.

* cited by examiner

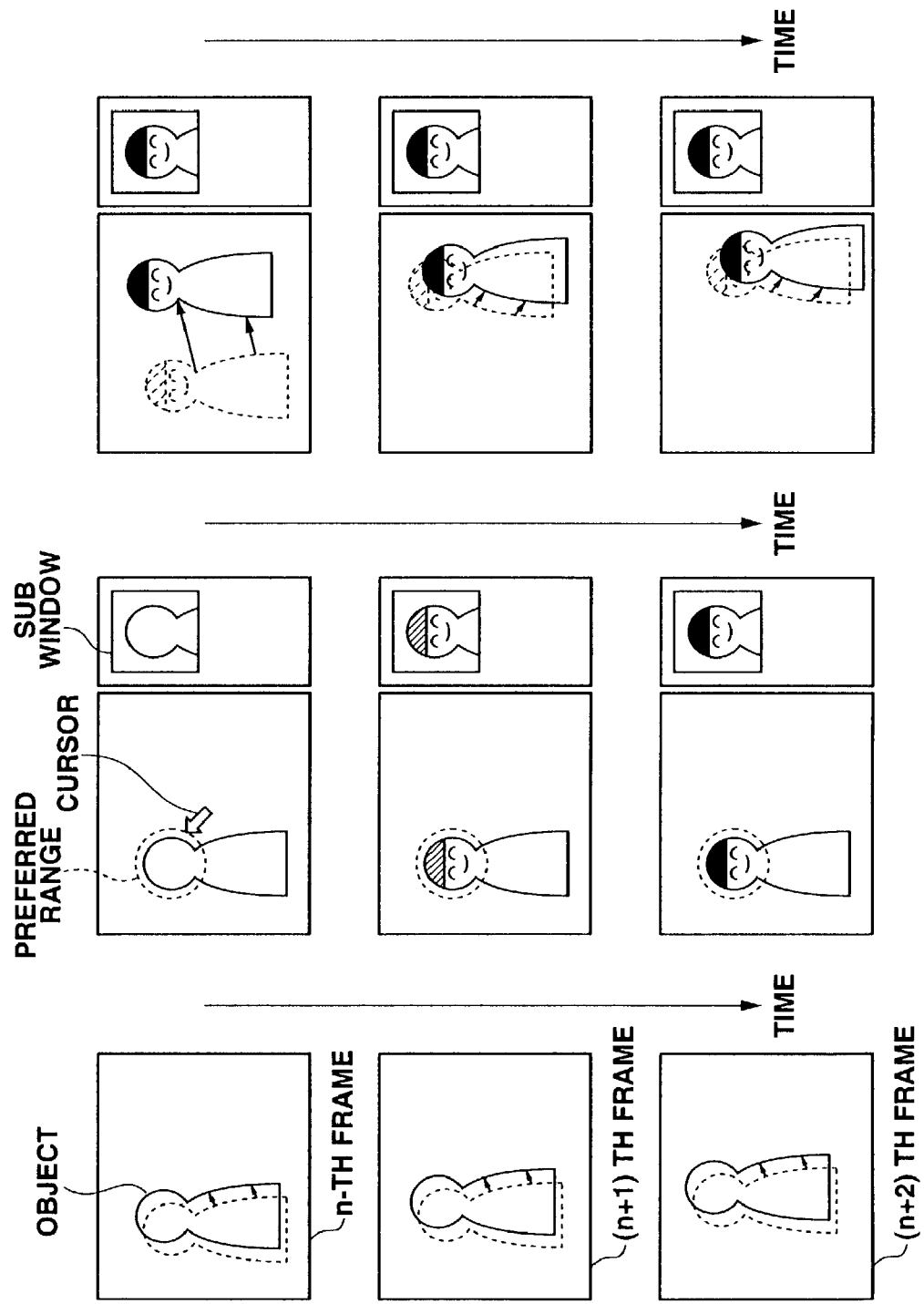

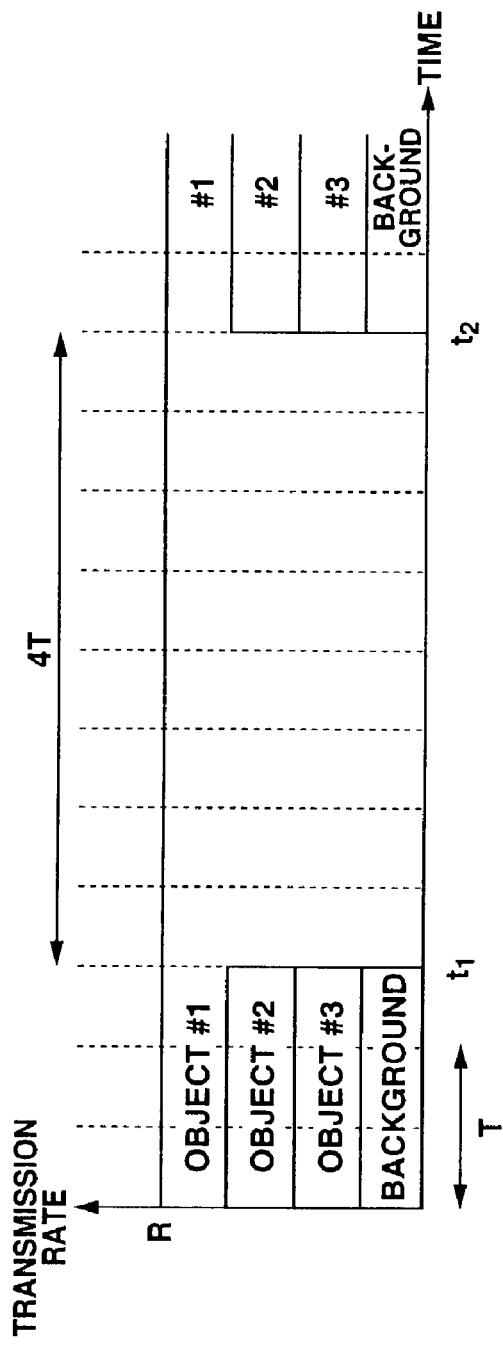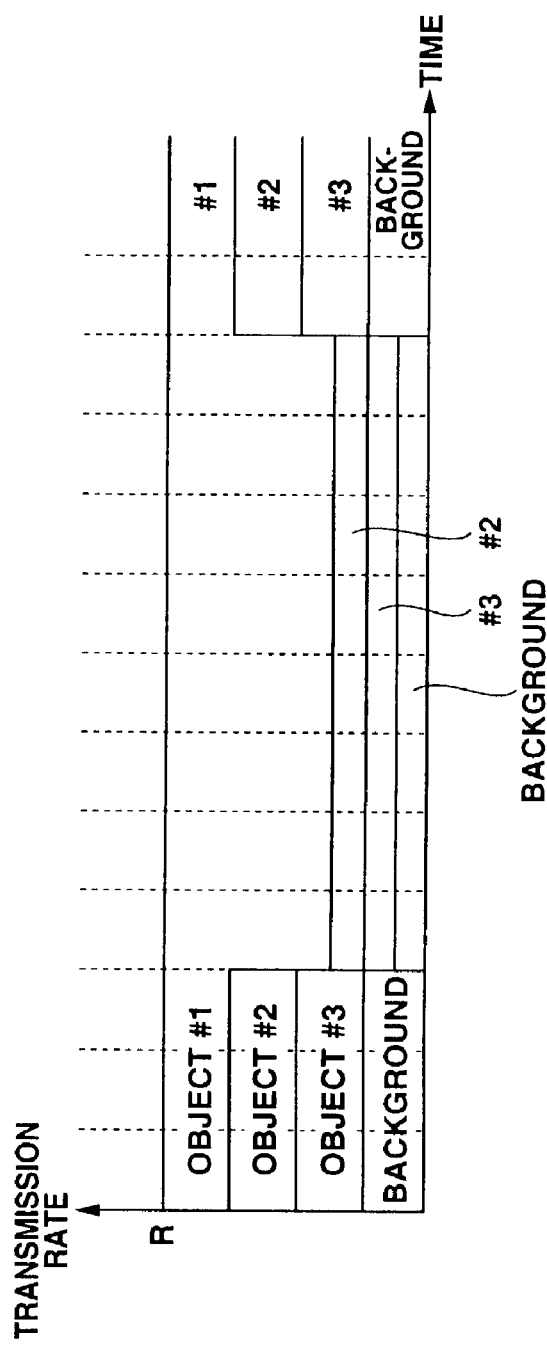

IMAGE PROCESSING APPARATUS AND METHOD, COMMUNICATION APPARATUS, COMMUNICATION SYSTEM AND METHOD, AND RECORDED MEDIUM

This Application is a 371 of PCT/JP01/04331 May 23, 2001.

TECHNICAL FIELD

The present invention generally relates to the field of image processing in which an area is localized in image data as designated by the user. More particularly, the present invention relates to an image processing apparatus and method, communication apparatus, communication system and method, and a recording medium, destined for extracting an object image from image data as designated by the user.

BACKGROUND ART

In the Japanese Published Unexamined Application No. 112856 of 1998, there is disclosed an image transmitter adapted to send image data in an area in an image in an amount of information and image data in another area in another amount of information from a sending side to a receiving side as designated by the receiving side. With the image transmitter disclosed in the Japanese Published Unexamined Application No. 112856 of 1998, it is possible to display an image of a specific area including designated points at a high spatial resolution and images other areas at low spatial resolutions.

More particularly, in case image data are sent from the sending side to receiving side via a transmission line, it is not possible to send image data whose data rate exceeds the transmission rate of the transmission line. Therefore, for real-time display of an image at the receiving side, image data have to be sent from the sending side to receiving side at a data rate lower than the transmission rate of the transmission line. As a result, if the transmission rate is not sufficient, all images will be displayed at the receiving side at lower spatial resolutions.

On the other hand, by permitting to send image data in an area in an image in an amount of information and image data in other areas in the image in another amount of information as in the image transmitter disclosed in the Japanese Published Unexamined Application No.112856 of 1998 and sending image data in a specific area including points designated by the receiving side in an increased amount of information and image data in other areas in a decreased amount of information, it is possible to display the image of the specific area including the points designated by the receiving side at a high spatial resolution and the images of other areas at a low spatial resolution. Thus, it is possible to display an image area the user wants to view in detail at a high spatial resolution while displaying other image areas at a low spatial resolution. That is, with the image transmitter disclosed in the Japanese Published Unexamined Application No. 112856 of 1998, it is possible to display an image area the user desires to view in detail at an improved spatial resolution at the sacrifice of the spatial resolution of the other areas.

Also, in the PCT Published Unexamined Application No. WO01/1189A1 of the Applicant of the present invention, there is disclosed an image processor adapted to effect the spatial resolution control as disclosed in the Japanese Published Unexamined Application No. 112856 of 1998 as well as the time resolution control in order to control the amount of information in an area designated at the receiving side. Further, the above PCT Published Unexamined Application No. WO01/1189A1 discloses an image processor adapted to extract object images from image data sent from the sending side to receiving side by judging, based on a position clicked with the mouse by the user at the receiving side and time interval between clicks, whether an image in the clicked position is moving or stationary and also whether the clicks are temporally successive.

It should be reminded here that to improve the spatial resolution of for example an image area (will be referred to as "interesting area" wherever appropriate hereunder) the user takes interest in seeing in detail and reduce the spatial resolution of other image areas such as background for example, it is necessary at the sending side to localize an image area the user at the receiving side, that is, an interesting area.

As in the above, if an area the user at the receiving side is interested in can be localized, it is possible when sending image data from the sending side to the receiving side to send an increased amount of image data in the interesting area.

The PCT Published Unexamined Application No. WO01-1189A1 discloses also a method for localizing an area the user is interested in as designated in a received image data by clicking the mouse or the like at the receiving side, for example, a method for extracting object images for example. In this method, however, since any object image is not reviewed, so there is a problem that objects which are extracted as object images at a time and which is uncoupled as another object image will always be handled as belonging to the same object.

Further, in case the user's interest shifts from one area to another image area, it is necessary to detect the shift of the user's interest and localize an image area the user is currently interested in. That is, processing of image data based on existing information after the user's interest has shifted to another image area, will possibly lead to a misjudgement. Therefore, in case the user's interest has shifted to another image area, the shift has to be detected for changing the manner of image data processing.

DISCLOSURE OF THE INVENTION

Accordingly, the present invention has an object to overcome the above-mentioned drawbacks of the prior art by providing an image processing apparatus and method, communication system and method, and a recording medium, capable of localizing an optimum interesting area by reviewing an area the user is interested in as well as of detecting an image area to which the user's interest has shifted.

The above object can be attained by providing an image processor comprising:

means for acquiring designation data from the user;

means for coupling image data corresponding to the designation data to each other to group them;

means for detecting a feature of the image data corresponding to the designation data; and means for uncoupling the image data, coupled by the coupling means and corresponding to the designation data, according to each feature of image data corresponding to the designation data in the same group.

Also, the above object can be attained by providing a communication system comprising:

a transmitter to send image data; and
a receiver to receive the image data sent from the transmitter;
the receiver including:
a first means for receiving the image data sent from the transmitter;
means for outputting the image data received by the first receiving means;
means for outputting the image data outputted from the outputting means;
means for designating a time-spatial position of the received image data outputted from the outputting means; and
a first means for sending designation data indicative of the time-spatial position of the image data, designated by the designating means; and
the transmitter including:
an input means to which image data are supplied continuously;
a second means for receiving the designation data sent from the first sending means;
means for coupling the image data corresponding to the designation data received by the second receiving means to each other to group them;
means for detecting features of the image data corresponding to the designation data; and
means for uncoupling the image data, coupled by the coupling means and corresponding to the designation data, according to each feature of the image data corresponding to the designation data in the same group.

In the transmitter provided in the above communication system, the means for coupling image data to group them couples small areas corresponding to earlier designation data and small areas corresponding to current designation data to each other by storing the same identifier information as identifier information corresponding to the earlier designation data stored in a storage means so as to correspond to the small areas corresponding to the current designation data. Also, the feature detecting means detects, as the feature, the movement of an object in image data in interesting small areas in interesting image data of moving image data consisting of a plurality of image data. When one of a plurality of small areas to which the same identifier information is appended by the coupling means is different in feature from other small areas, the uncoupling means uncouples the one and other small areas from each other by changing the identifier information of the one small area to different one of the other small areas.

Also, the above object can be attained by providing an image processing method including the steps of:

acquiring designation data from the user;
coupling image data corresponding to the designation data to each other to group them;
detecting a feature of the image data corresponding to the designation data; and
uncoupling the image data, coupled by the coupling means and corresponding to the designation data, according to each feature of image data corresponding to the designation data in the same group.

Also, the above object can be attained by providing a communication method for communications of image data between a transmitter and receiver, wherein:

the receiver functions to:
receive the image data sent from the transmitter;
output the image data received by the first receiving means;
output the image data outputted from the outputting means;
designate a time-spatial position of the received image data outputted from the outputting means; and
send designation data indicative of the time-spatial position of the image data, designated by the designating means; and
the transmitter functions to:
receive image data continuously;
receive the designation data sent from the first sending means;
couple the image data corresponding to the designation data received by the second receiving means to each other to group them;
detect features of the image data corresponding to the designation data; and
uncouple the image data, coupled by the coupling means and corresponding to the designation data, according to each feature of the image data corresponding to the designation data in the same group.

Also, the above object can be attained by providing a recording medium having provided there a program which can be read by an information processing means, the program comprising the steps of:

acquiring designation data from the user;
coupling image data corresponding to the designation data to each other to group them;
detecting a feature of the image data corresponding to the designation data; and
uncoupling the image data, coupled by the coupling means and corresponding to the designation data, according to each feature of image data corresponding to the designation data in the same group.

Also, the above object can be attained by providing a recording medium having recorded therein a program which can be read by an information processing means, the program controlling:

the receiver to:
receive the image data sent from the transmitter;
output the image data received by the first receiving means;
designate a time-spatial position of the received image data outputted from the outputting means; and
send designation data indicative of the time-spatial position of the image data, designated by the designating means; and
the transmitter to:
receive image data continuously;
receive the designation data sent from the first sending means;
couple the image data corresponding to the designation data received by the second receiving means to each other to group them;
detect features of the image data corresponding to the designation data; and
uncouple the image data, coupled by the coupling means and corresponding to the designation data, according to each feature of the image data corresponding to the designation data in the same group.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 14A, 14B and 14C show examples of displays of an image on the image output unit of the receiver in FIG. 4.

FIGS. 15A and 15B explain the relation between the spatial resolution and time resolution of an image sent from the transmitter and receiver, included in the communication system in FIG. 1.

BEST MODE FOR CARRYING OUT THE INVENTION

The preferred modes of carrying out the present invention will be described herebelow with reference to the accompanying drawings.

Figure 1:
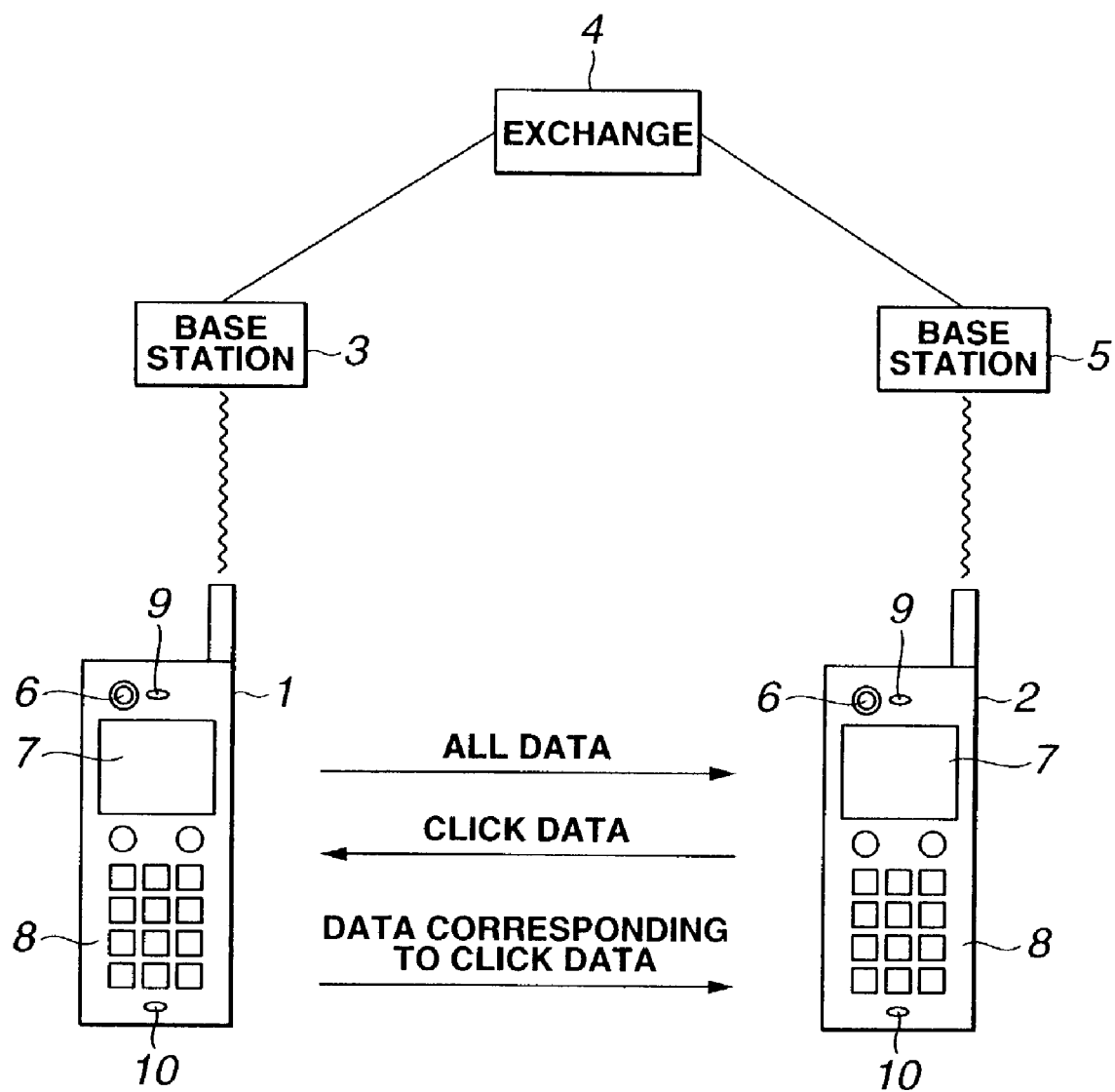
FIG. 1 is a block diagram of the communication system according to the present invention.

The data communication system according to the present invention is configured as shown in FIG. 1. The term "system" used herein refers to a logical assembly of a plurality of apparatuses whether the apparatuses of different constructions are in the same enclosure or not.

As shown in FIG. 1, the data communication system includes at least two terminals 1 and 2 each being for example a mobile telephone, PHS (personal handy-phone system: registered trademark) or the like, a radio base station 3 or 5 which makes radio communications with the terminal 1 or 2, and an exchange 4 such as a telephone station which provides a connection between the base stations 3 and 5. Note that the radio base stations 3 and 5 are identical to each other or different from each other. With the above system configuration, the terminals 1 and 2 can send signals from one to the other of them and receive signals from their counterpart, via a transmission line formed from the radio base stations 3 and 5, exchange 4, etc.

In the data communication system shown in FIG. 1, each of the terminals 1 and 2 being a mobile telephone, PHS or the like includes at least a key pad 8 for input of a phone number, characters, symbols, etc., a microphone 10 for input of a sound, a speaker 9 for output of a sound, a video camera 6 having an imaging device and optical system, capable of picking up a still image and moving image, respectively, and a display unit 7 capable of displaying characters and symbols as well as an image.

Between the terminals 1 and 2, there can be transferred sound signals as well as image data captured by the video camera 6. Therefore, each of the terminals 1 and 2 can display an image picked up by its counterpart on the display unit 7.

There will be described here by way of example a data communication in which for example the terminal 1 sends image data while the terminal 2 receives the image data from the terminal 1. In the following description, the terminal 1 or 2 will be referred to as "transmitter 1" or "receiver 2", respectively, wherever appropriate.

In this case, image data are sent along with information on its frame rate from the transmitter 1 to the receiver 2 via a transmission line including the base stations 3 and 5, exchange 4, etc. Receiving the image data sent from the transmitter 1, the receiver 2 will display, on the display unit 7 such as a liquid crystal display (LCD) or the like, a moving image reproduced from the image data according the received frame rate information. On the other hand, the receiver 2 will send, to the transmitter 1 via the transmission line, control information used to control the spatial resolution and time resolution of the image displayed on the display unit 7. That is, the receiver 2 will send, to the transmitter 1, control information ("click data" as designation data which will further be described later) used at the transmitter 1 to localize an area the user of the receiver 2 is interested in.

Receiving the control information (click data) from the receiver 2, the transmitter 1 will localize, based on the click data, the image area (interesting area) the user of the receiver 2 is interested in from an image to be displayed at the receiver 2, such as an image picked up by the video camera 6 of the transmitter 1. Further, the transmitter 1 will control the amount of information in image data to be sent to the receiver 2 in such a manner that the spatial resolution and time resolution of the localized image area will be changed while satisfying given conditions. Note that in case each of the transmitter 1 and receiver 2 is a PHS terminal for example, the frequency range of the transmission line will be 1895.1500 to 1905.9500 MHz and the transmission rate will be 128 kbps (bit per second).

Figure 2:
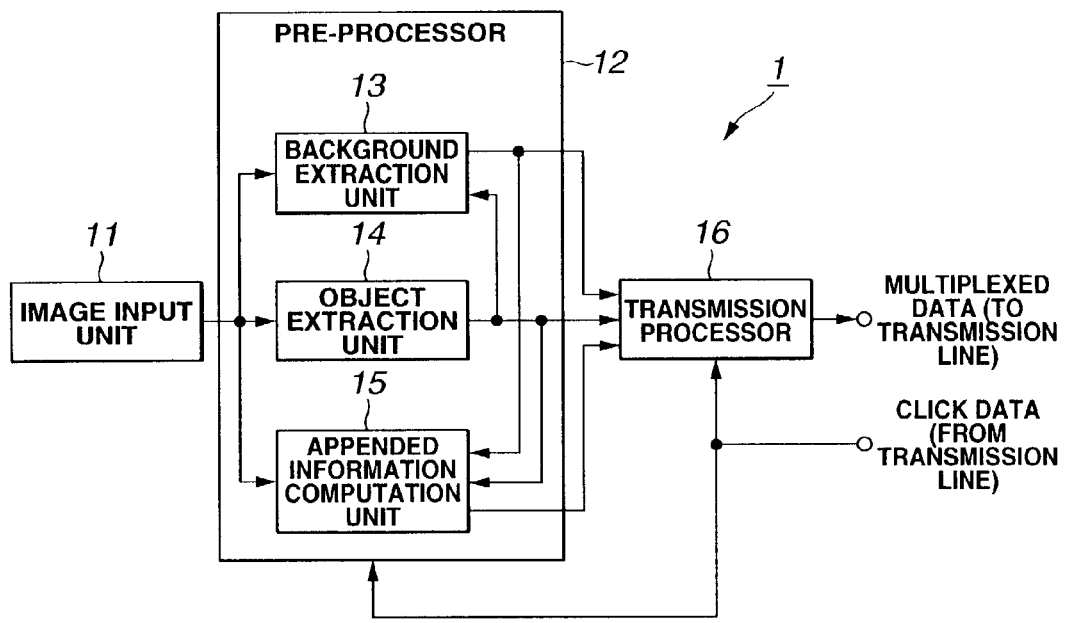
FIG. 2 is a block diagram of the transmitter included in the communication system in FIG. 1.

Referring now to FIG. 2, there is illustrated in the form of a block diagram the transmitter 1 included in the data communication system shown in FIG. 1. As shown, the transmitter 1 further includes an image input unit 11 consisting of the video camera 6 having for example the imaging device (CCD: charge-coupled device) and optical system, an image signal processing circuit to generate image data from the image signal picked up by the video camera 6, etc. That is, the user of the transmitter 1 images a desired object by the video camera 6, the image signal processing circuit generates image data from the image supplied from the video camera 6, and the image input unit 11 sends the image data to a pre-processor 12.

The pre-processor 12 includes mainly a background extraction unit 13, object extraction unit 14 and an appended information computation circuit 15. Further detailed description of the pre-processor 12 will be given later.

Based on the click data sent from the receiver 2, the object extraction unit 14 of the pre-processor 12 extracts, from the image captured by the video camera 6 of the image input unit 11, an area the user of the receiver 2 is interested in, that is, an interesting area, and supplies a transmission processor 16 with image data corresponding to the extracted interesting area. Note that in case the image picked up by the video camera 6 of the image input unit 11 includes a plurality of areas the user of the receiver 2 is interested in, the object extraction unit 14 will supply image data corresponding to the plurality of interesting areas to the transmission processor 16. Also, the image data corresponding to the interesting area extracted by the object extraction unit 14 is also supplied to the appended information computation unit 15.

The area the user is interested in is for example an object such as a substance found in an image. Note that the "object" referred to herein is one of pieces of an image divided by a unit and which can be processed per unit and for processing each of special substances in an image, the substance is defined as "object". According to the present invention, object data are extracted from an image on the basis of click data and processed per object. Note that object is prepared in different manners depending upon the content of a required image.

In the object extraction unit 14, an object as an example of interesting area (will be referred to as "appropriate object" hereunder) is extracted as will be described below. Note that the interesting area has not to always be an object but may be an image area other than an object, image area in an object or background image part which will be described later or the like. The present invention will be described concerning an object as an interesting area.

In the embodiment of the present invention, small-object image data corresponding to click data derived from clicking of an image by the user are extracted and the small-object image data are connected or not to each other to extract object image data and then extract an object image from the object image data.

Also, when the interest of the user of the receiver 2 is directed to another area, the object extraction unit 14 will detect the change of interest to extract an object image being a new interesting area based on the result of detection of the change in interest of the user. The object extraction effected in the object extraction unit 14, that is, the localization of an interesting area and detection of an area to which the user's interest has shifted will further be described later.

Next, the background extraction unit 13 of the preprocessor 12 extracts, based on the object extraction result supplied from the object extraction unit 14, signals (will be referred to as "background image data" hereunder) equivalent to a background portion (image area other than the interesting area; will be referred to as "background image" hereunder) of an image from the image data supplied from the image input unit 11, and supplies the extracted background image data to the transmission processor 16 and appended information computation unit 15. The background image is a flat image area whose activity is low and having no special meaning as an image. Of course, the background image includes an image having no special meaning as well as an object the user is interested in, but for the simplicity of the explanation, the above flat image area will be taken as a background image in the following description of the present invention.

The appended information computation unit 15 detects, based on the background image data supplied from the background extraction unit 13, a movement of the background caused by the change in imaging direction of the image input unit 11 during imaging, for example a background movement vector indicative of a panning and tilting. The appended information computation unit 15 detects, based on the image data of an object (will be referred to as "object image data" hereunder) supplied from the object extraction unit 14, an object movement vector indicative of a movement of the object. The appended information computation unit 15 supplies the transmission processor 16 with the movement vectors as appended information. Also, based on the object image data supplied from the object extraction unit 14, the appended information computation unit 15 supplies the transmission processor 16 with an image picked up by the video camera 6 of the image input unit 11, that is, information on the object such as a position, profile indicating a shape, etc. of the object in a frame image, as appended information. Namely, the object extraction unit 14 extracts also information on the object such as position, shape, etc. of the object during extraction of an object image, and supplies them to the appended information computation unit 15. The appended information computation unit 15 will output the information on the object as appended information.

Based on the click data supplied from the receiver 2, the transmission processor 16 encodes the object image data from the object extraction unit 14, background image data from the background extraction unit 13 and appended information from the appended information computation unit 15 so as to meet the requirement for a data rate at which data can be transmitted on the transmission line while raising the spatial and time resolutions of the object image in aan image to be displayed on the display unit 2. Further, the transmission processor 16 multiplexes the encoded object image data (will be referred to as "object encoded data" hereunder), background image data (will be referred to as "background encoded data" hereunder) and appended information (will be referred to as "appended information encoded data" hereunder), and sends the multiplexed data along with frame rate information to the receiver 2 via the transmission line.

Next, the operations of the transmitter 1 shown in FIG. 2 will be described with reference to the flow chart shown in FIG. 3.

Figure 3:
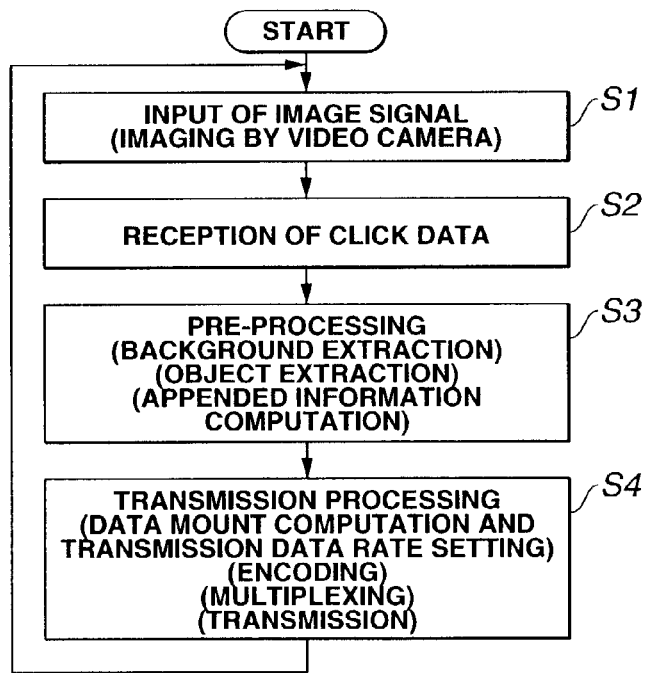
FIG. 3 shows a flow of operations made in the transmitter in FIG. 2.

First in step S1 in FIG. 3, the video camera 6 of the image input unit 11 at the transmitter 1 captures an image, and sends the image data to the pre-processor 12.

Next in step S2, the transmitter 1 receives the click data sent from the transmitter 2, and supplies the click data to the pre-processor 12.

In step S3, the pre-processor 12 having received the image data and click data preprocesses the data for background extraction, object extraction and appended information computation, and sends background image data, object image data and appended information thus obtained to the transmission processor 16. The object extraction includes detection of interesting-object change as well.

In step S4, the transmission processor 16 computes amounts of the object image data, background image data and appended information so as to meet the requirement for a data rate at which data can be transmitted via the transmission line, and multiplexes the object image data, background image data and appended information according to their data amount by encoding them as will further be described later. Thereafter, the transmission processor 16 will send the multiplexed data along with frame rate information to the receiver 2 via the transmission line.

Subsequently, the procedure returns to step S1 and similar operations are repeated.

Figure 4:
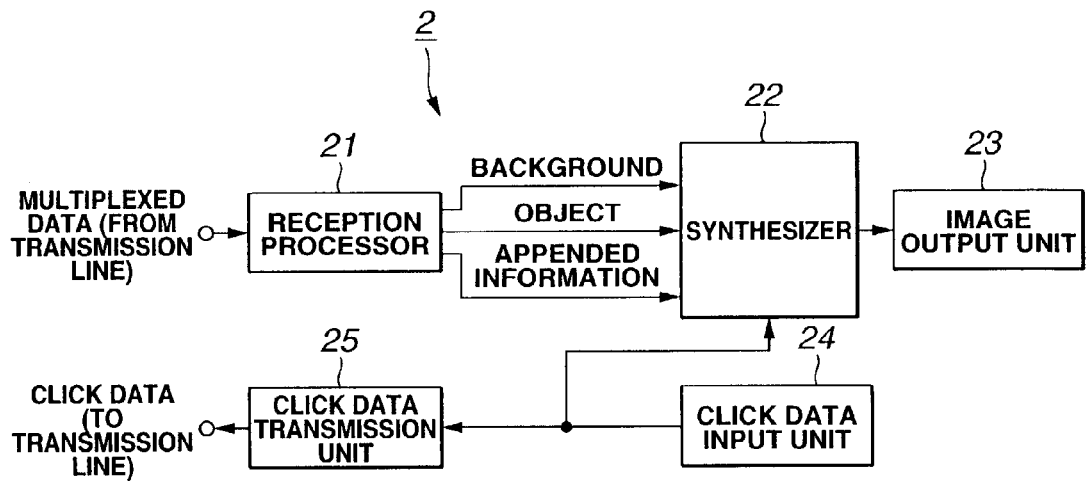
FIG. 4 is a block diagram of the receiver included in the communication system in FIG. 1.

FIG. 4 shows the construction of the receiver 2 included in the data communication system shown in FIG. 1.

The multiplexed data sent from the transmitter 1 via the transmission line are received by a reception processor 21 in the receiver 2 shown in FIG. 4. The reception processor 21 will demultiplex, from the received multiplexed data, the background encoded data, object encoded data and appended information encoded data and decode them, and send the decoded background image data, object image data and appended information to a synthesizer 22.

The synthesizer 22 will synthesize an image from the decoded background image date, object image data and appended information supplied from the reception processor 21, and supply the synthesized image signals to an image output unit 23. Also, the synthesizer 22 controls the spatial and time resolutions of the synthesized image based on the click data supplied from a click data input unit 24.

Based on the supplied image data, the image output unit 23 will generate a drive signal for driving the liquid crystal display or the like in the display unit 7 and send the drive signal to the liquid crystal display or the like at a frame rate which is based on the frame rate information received along with the aforementioned multiplexed data. Thus, the image synthesized by the synthesizer 22 is displayed on the display unit 7.

When the user operates the key pad 8 having the function as a pointing device to designate a coordinate position of an image on the display unit 7, the click data input unit 24 generates click data indicating a clicked position corresponding to the operation of the key pad 8 by the user, that is, a coordinate position, and a clicked time. Namely, when the user clicks the key pad 8 to designate an interesting area being a desired image portion in an image displayed on the display unit 7, the click data input unit 24 generates click data indicating coordinate information on the clicked position and a clicked time. The click data generated by the click data input unit 24 are sent to the synthesizer 22 and click data transmission unit 25.

Receiving the click data from the click data input unit 24, the click data transmission unit 25 sends it to the transmitter 1 via the transmission line.

Figure 5:
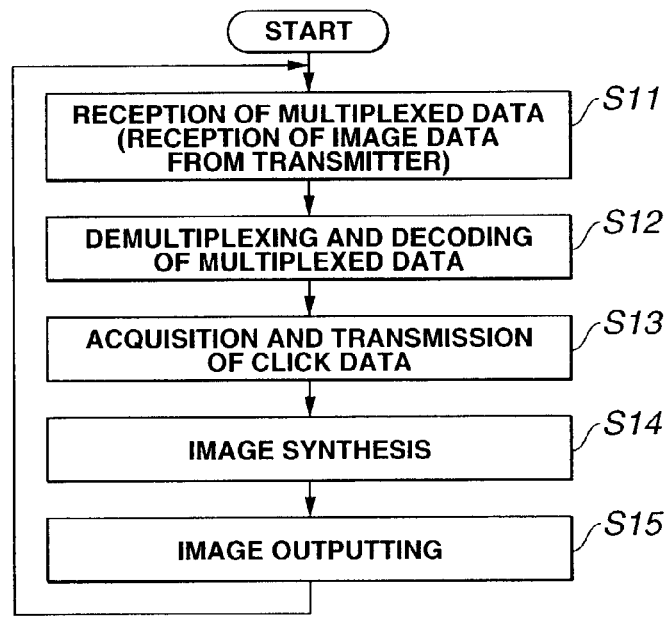
FIG. 5 shows a flow of operations made in the receiver in FIG. 4.

Next, the operations of the receiver 2 shown in FIG. 4 will be outlined with reference to the flow chart shown in FIG. 5.

First in step S11 in FIG. 5, the reception processor 21 in the receiver 2 receives the multiplexed data from the transmitter 1 via the transmission line.

Next in step S12, the reception processor 21 demultiplexes, from the multiplexed data, the background encoded data, object encoded data and appended information encoded data, and then decodes the thus demultiplexed encoded data. The decoded background image data, object image data and appended information are sent to the synthesizer 22.

In step S13, the click data input unit 24 of the receiver 2 acquires the click data by clicking the key pad 8 by the user, sends it to the synthesizer 22 and also to the click data transmission unit 25, and the click data are sent from the click data transmission unit 25 to the transmitter 1.

Next in step S14, the synthesizer 22 synthesizes an image from the background image data, object image data and appended information supplied from the reception processor 21 and the click data supplied from the click data input unit 24, and controls the spatial and time resolutions of the synthesized image.

Thereafter in step S15, the image output unit 23 has the liquid crystal display or the like in the display unit 7 display the image synthesized by the synthesizer 22 thereon on the basis of the frame rate information received along with the multiplexed data.

Thereafter, the procedure returns to step S11, and similar operations are repeated.

Next, the construction of the transmission processor 16 included in the transmitter 1 shown in FIG. 2 will be described in detail with reference to FIG. 6.

Figure 6:
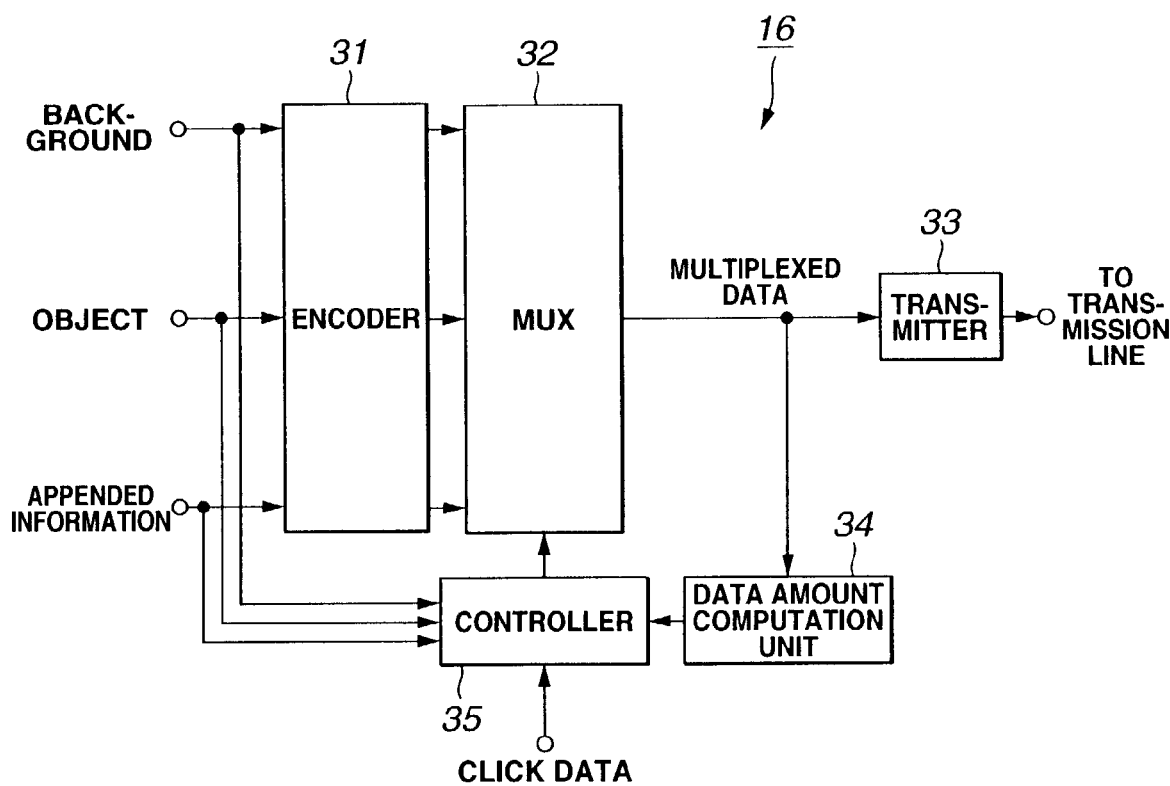
FIG. 6 is a block diagram of the transmission processor included in the transmitter in FIG. 2.

As shown in FIG. 6, the transmission processor 16 is supplied with the background image data, object image data and appended information from the pre-processor 12 in FIG. 2. The background image data, object image data and appended information are supplied to an encoder 31 and controller 35.

The encoder 31 hierarchically encodes the supplied background image data, object image data and appended information as will further be described later, and supplies each data thus encoded to a multiplexer (MUX) 32.

Under the control of the controller 35, the MUX 32 selects the background encoded data, object encoded data and appended information encoded data supplied from the encoder 31 and supplies them as multiplexed data to a transmission unit 33.

The transmission unit 33 modulates the multiplexed data supplied from the MUX 32 according to the aforementioned frame rate information and the transmission standard for a downstream transmission line, and sends the modulated multiplexed data to the receiver 2 via the downstream transmission line.

Also, the data amount computation unit 34 monitors the multiplexed data outputted from the MUX 32 to the transmission unit 33, compute a data rate for the multiplexed data and supplies the computed data rate to the controller 35.

The controller 35 controls the output of multiplexed data from the MUX 32 so that the data rate computed by the data amount computation unit 34 will not exceed the transmission rate of the transmission line while receiving the click data received from the receiver 2 via the transmission line to control the multiplexing of the encoded data in the MUX 32.

Figure 7:
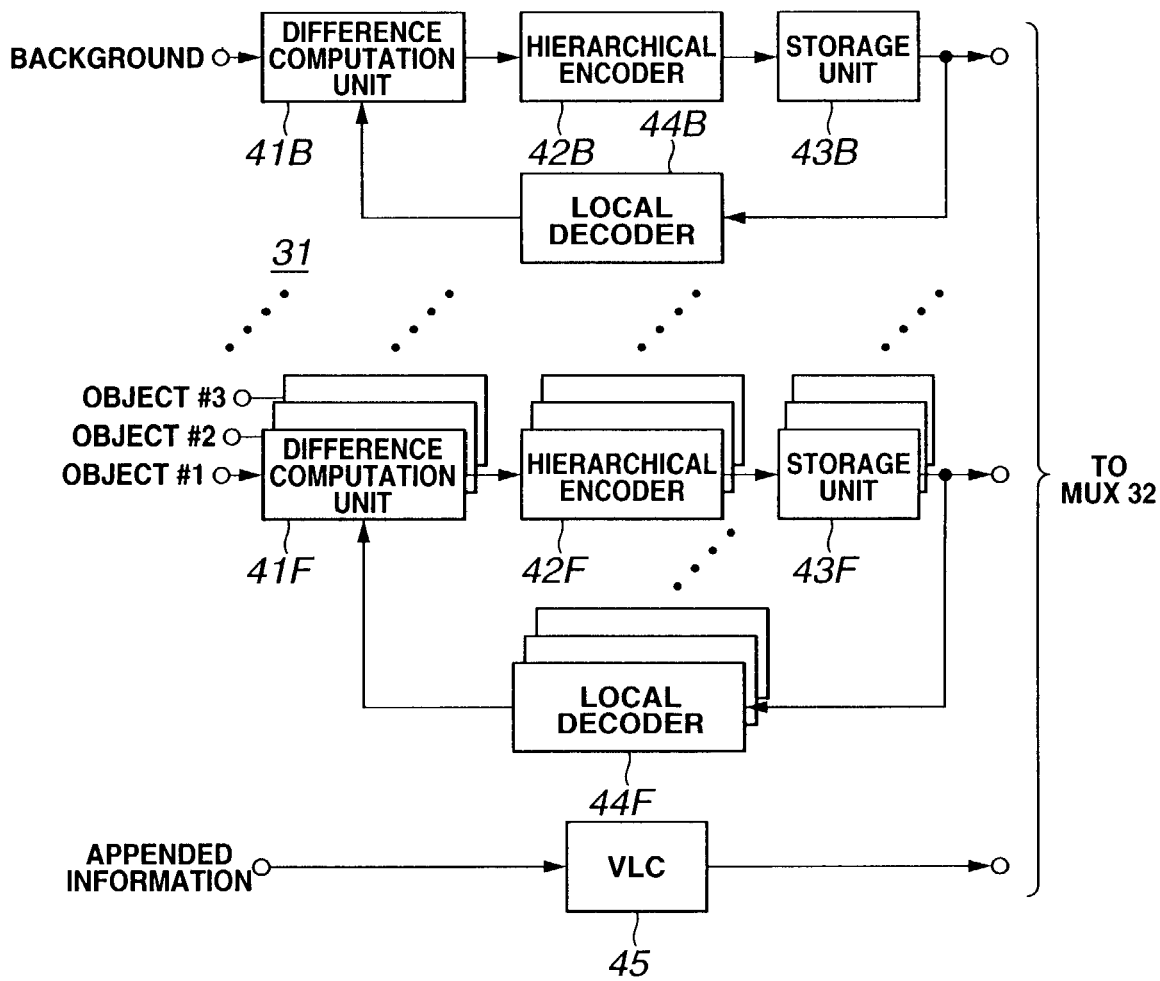
FIG. 7 is a block diagram of the encoder of the transmission processor in FIG. 6.

The encoder 31 shown in FIG. 6 is constructed as shown in detail in FIG. 7.

In the encoder 31 in FIG. 7, the background image data are supplied to a difference computation unit 41B. The difference computation unit 41B subtracts one frame-precedent, already processed background image data from background image data contained in an image frame (will be referred to as "current frame" hereunder wherever appropriate) supplied from a local decoder 44B and going to be processed at present, and supplies difference data of the background image (will be referred to as "background image difference data" hereunder) as the subtraction result to a hierarchical encoder 42B.

The hierarchical encoder 42B hierarchically encodes the background image difference data from the difference computation unit 41B, and supplies data obtained by the encoding, that is, background encoded data, to a storage unit 43B.

The storage unit 43B provisionally stores the background encoded data supplied from the hierarchical encoder 42B. The background encoded data stored in the storage unit 43B are sent to the MUX 32 in FIG. 6.

Further, the background encoded data stored in the storage unit 43B are supplied to tile local decoder 44B. The local decoder 44B locally decodes the background encoded data to decode their initial background image data, and supplies the decoded background image data to the difference computation unit 41B. The background image data thus decoded by the local decoder 44B are used in the difference computation unit 41B to acquire data on a difference from background image data in a next frame.

In the encoder 31 in FIG. 7, the object image data are supplied to a difference computation unit 41F. The difference computation unit 41F subtracts one frame-preceding, already processed background image data from object image data contained in an image frame (current frame) supplied from a local decoder 44F and going to be processed at present, and supplies difference data of the object (will be referred to as "object image difference data" hereunder) as the subtraction result to a hierarchical encoder 42F.

The hierarchical encoder 42F hierarchically encodes the background image difference data from the difference computation unit 41F, and supplies data obtained by the encoding (object encoded data) to a storage unit 43F.

The storage unit 43F provisionally stores the object encoded data supplied from the hierarchical encoder 42F. The object encoded data stored in the storage unit 43F are sent to the MUX 32 in FIG. 6.

Further, the object encoded data stored in the storage unit 43F are supplied to the local decoder 44F. The local decoder 44F locally decodes the object encoded data to decode their initial object image data, and supplies the decoded object image data to the difference computation unit 41F. The object image data thus decoded by the local decoder 44F are used in the difference computation unit 41F to acquire data on a difference from object image data in a next frame.

Note that in case there exists a plurality of objects (#1, #2, #3, ... ), image data corresponding to the plurality of objects are subject to difference computation, hierarchical encoding, storage and local decoding by the difference computation unit 41F, hierarchical encoder 42F, storage unit 43F and local decoder 44F, respectively.

Also, in the encoder 31 shown in FIG. 7, the appended information is supplied to a VLC (variable-length encoder) 45. The VLC 45 makes variable-length encoding of the appended information. The variable-length encoding method may be a one which can compress the data by reducing the redundance. Namely, the variable-length encoding may be the run-length encoding, Huffman encoding or the like. The variable-length encoded appended information is sent as the aforementioned appended information encoded data to the MUX 32 in FIG. 6.

Figure 8:
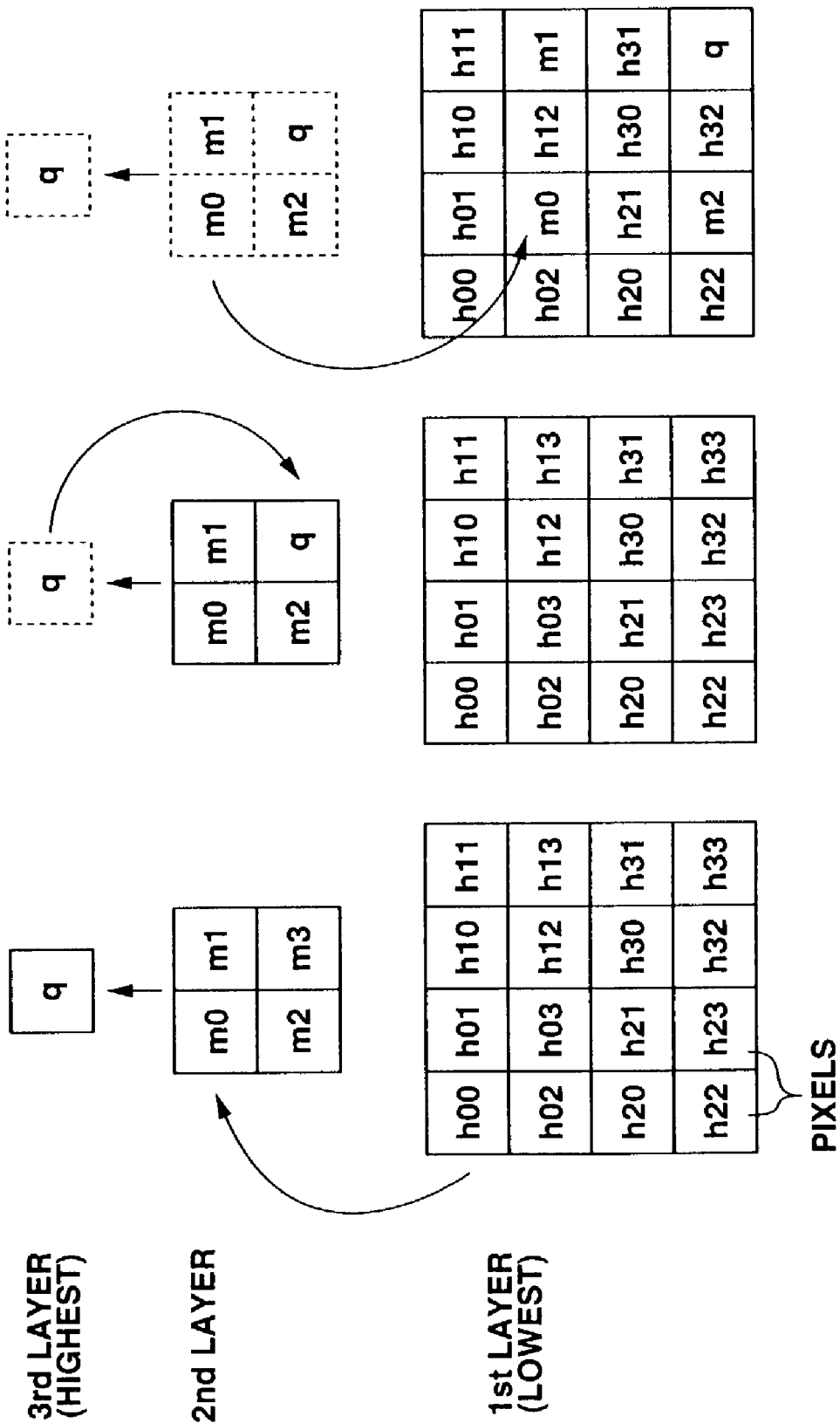
FIGS. 8A, 8B and 8C explain the hierarchical encoding/decoding.

Next, the hierarchical encoding effected in the encoder 31 in FIG. 7 and the decoding effected at the receiving side correspondingly to the hierarchical encoding will be described with reference to FIG. 8.

The encoder 31 in FIG. 7 makes, for each of 3 layers, for example, such a hierarchical encoding as to take a mean value (mean pixel value) of 4 pixels consisting of 2 horizontal pixels and 2 vertical pixels in a low layer for example as a value of one pixel in a layer one level higher than the low layer. Note that the term "pixel value" used herein refers to a difference obtained by the difference computation effected as a preliminary operation for the hierarchical encoding, namely, a difference of each pixel. Of course, in case no difference computation is done before the hierarchical encoding, the pixel value is not such a specified one.

The above will further be described below on the assumption that an image in the lowest layer (first layer) consists of 4 horizontal pixels and 4 vertical pixels (will be referred to as "4×4 pixels" hereunder) for example as shown in FIG. 8A. In this case, the hierarchical encoding will be such that there is calculated a mean value of four pixels h00, h01, h02 and h03 including the two horizontal pixels and two vertical pixels (will be referred to as "2×2 pixels" hereunder) at the upper left of the 4×4 pixels and the mean value is taken as the value of a pixel m0 at the upper left in the second layer. Similarly, a mean value of 2×2 pixels h10, h11, h12 and h13 at the upper right of the 4×4 pixels in the first layer is taken as the value of a pixel m1 at the upper right of the second layer; mean value of 2×2 pixels h20, h21, h22 and h23 at the upper left of the 4×4 pixels in the first layer is taken as the value of a pixel m2 at the lower left of the second layer; and mean value of 2×2 pixels h30, h31, h32 and h33 at the lower right of the 4×4 pixels in the first layer is taken as the value of a pixel m3 at the lower right of the second layer. Further in the hierarchical encoding, a mean value of four pixels m0, m1, m2 and m3 included in the 2×2 pixels in the second layer is determined and taken as the value of a pixel q in the third layer (highest layer).

In the encoder 31 in FIG. 7, the hierarchical encoding is effected as having been described just above. Note that with such a hierarchical encoding, the spatial resolution of an image in the highest layer (third layer) is lowest, that of images in the lower layers will be higher and that of an image in the lowest layer (first layer) will be highest.

In case all the above pixels h00 to h03, h10 to h13, h20 to h23, h30 to h33, m0 to m3 and q are to be sent, the data amount will be larger by the pixels m0 to m3 in the second layer and pixel q in the third layer than when only the pixels in the lowest layer are sent.

To decrease the data amount for sending, the pixel q in the third layer is embedded in place of for example the pixel m3, at the upper right, of the pixels m0 to m3 in the second layer as shown in FIG. 8B and the data of the second layer thus consisting of the pixels m0, m1, m2 and q and data of the first layer are sent. Thus, the data amount can be smaller by the data amount of the third layer.

For sending the data in an amount decreased more than in the measure shown in FIG. 8B, the pixel m0 in the second layer is replaced by for example the pixel h03, at the lower right, of the 2×2 pixels h00 to h03 in the first layer, used to determine the pixel m0, similarly the pixel m1 in the second layer is replaced by for example the pixel h13, at the lower right, of the 2×2 pixels h10 to h13 in the first layer, used to determine the pixel m1, also the m2 in the second layer is replaced by for example the pixel h23, at the lower right, of the 2×2 pixels h20 to h23 in the first layer, used to determine the pixel m2, as shown in FIG. 8C, and further the q in the third layer, buried in an pixel at the lower right of the pixels m0 to m3 in the second layer in FIG. 8B is replaced by for example the pixel h33, at the lower right, of the 2×2 pixels h30 to h33 in the first layer. The data amount in the third and second layers can thus be reduced. That is, in the example shown in FIG. 8C, 16 pixels (4×4 pixels) are thus transmitted, which number of pixels is the same as that of the pixels in the lowest (first) layer as shown in FIG. 8A. Therefore, it is possible in this case to send data equivalent to pixels in each of the first to third layers in an amount not increased.

Note that the pixel m3 in the second layer, replaced with the pixel q as in FIG. 5B, and the pixels h03, h13, h23 and h33 in the first layer, replaced with the pixels m0, m1, m2 and q, as in FIG. 8C, can be decoded as will be described below.

Namely, since the value of the pixel Q is a mean value of the pixels m0 to m3, it can be given by an equation of q=(m0+m1+m2+m3)/4. Thus, an equation of m3=4×q−(m0+m1+m2) can be used to determine (decode) the value of the pixel m3 in the third layer from the pixel q in the third layer and pixels m0 to m2 in the second layer.

Also, since the value of the pixel m0 is a mean value of the pixels h00 to h03, it can be given by an equation of m0=(h00+h01+h02+h03)/4. Thus, an equation of h03=4×m0−(h00+h01+h02) can be used to determine the value of the pixel h03 in the first layer from the pixel m0 in the second layer and pixels h00 to h02 in the first layer. Similarly, the value of each of the pixels h13, h23 and h33 can be determined.

As in the above, pixels included in a layer and not sent can be decoded from sent pixels included in the layer and sent pixels included in a one-level higher layer.

Figure 9:
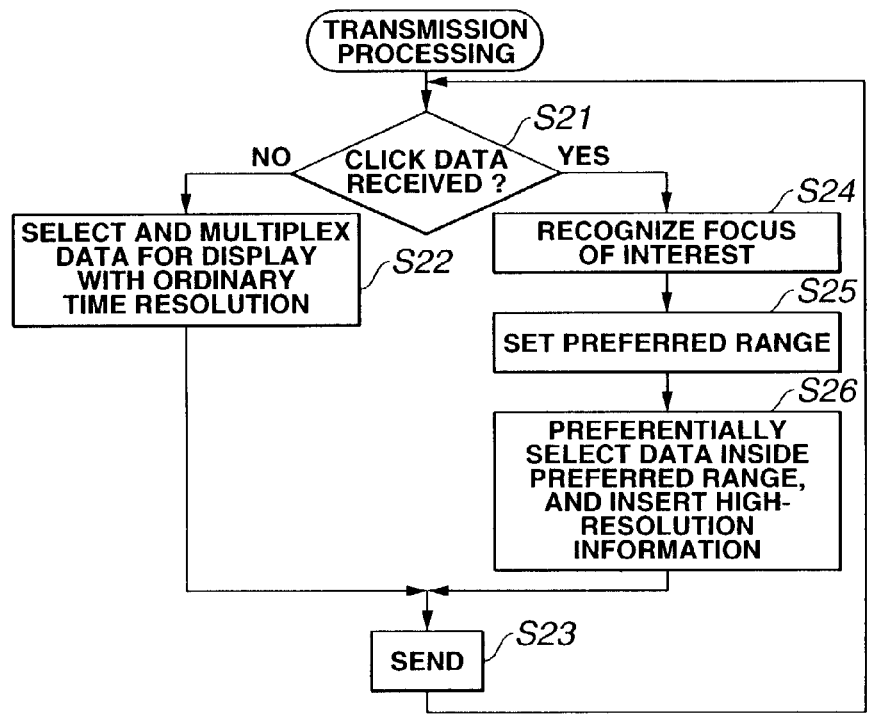
FIG. 9 shows a flow of operations made in the transmission processor in FIG. 6.

Next, the transmission processing effected in the transmission processor 16 in FIG. 6 will be described with reference to the flow chart in FIG. 9.

First in step S21, the controller 35 in the transmission processor 16 judges whether click data has been sent from the receiver 2. If it judges that no click data has been transmitted from the receiver 2, namely, if the controller 35 has not received any click data, the controller 35 will control, in step S22, the MUX 32 to select and multiplex background encoded data, object encoded data and appended information encoded data so that the receiver 2 can display an image with an ordinary time resolution such as a default time resolution.

That is, when for example 30 frames/sec is set as the ordinary time resolution, the receiver 2 will display an image at a rate of 30 frames/sec. In this case, when multiplexed data has been sent at the transmission rate of the transmission line while maintaining the time resolution of 30 frames/sec, the MUX 32 will select and multiplex the encoded data of background, object and appended information so that the spatial resolution of an image displayed at the receiver 2 will be highest.

More particularly, in case the hierarchical encoding has been effected with the three layers for example as in the above, if only the data in the third layer can be sent at the transmission rate of the transmission line for display of an image at the rate of 30 frames/sec, the MUX 32 will select the encoded data of background, object and appended data for display of the image data in the third layer. In this case, the receiver 2 ill display an image at the time resolution is 30 frames/sec and at horizontal and vertical spatial resolutions being a quarter of those of the first layer image data as their initial data.

Next in step S23, the transmission processor 16 will send, from the transmission unit 33, the multiplexed data from the MUX 32 along with the aforementioned set frame rate information via the transmission line, and then the procedure returns to step S21.

If the controller 35 judges in step S21 that click data has been sent from the receiver 2, namely, if it has received the click data, it will recognize, in step S24, based on the click data, a clicked position being a coordinate of a focus of interest designated by the user by operating the clock data input unit 24 of the receiver 2, and a clicked time.

Then in step S25, the controller 35 will localize, based on the coordinate of the focus of interest, and clicked time, an area the user of the receiver 2 is interested in and set the thus localized interesting area as a preferred range in which the spatial resolution of an image displayed at the receiver 2 is preferentially improved, to thereby detect an image in the preferred range and corresponding appended information. Note that in the present invention, the image inside the preferred range corresponds to an object image while an image outside the preferred range corresponds to an image outside the interesting area such as a background image.

In step S26, the controller 35 controls the MUX 32 to select and multiplex encoded data of an image inside the preferred range (object image), image outside the preferred range (background image) and appended information so that the image inside the preferred range will be displayed with a higher spatial resolution at the receiver 2. Namely, when having received clock data from the receiver 2, the controller 35 will control the MUX 32 to improve the spatial resolution of an image inside the preferred range by the sacrifice of the time resolution.

In the above, the controller 35 controls the MUX 32 to improve the spatial resolution of an image inside the preferred range. However, the controller 35 nay control the MUX 32 to improve the time resolution of an image inside the preferred range, that is, the frame rate of an image inside the preferred range. In this case, the controller 35 may attain the improvement by the sacrifice of the spatial resolution. Also, the controller 35 may control the total information amount by handling an image corresponding to a background image outside the preferred range as a still image.

Thus, for an image inside the preferred range, the MUX 32 preferentially selects and multiplexes encoded data for display of image data in the third layer and also in the second layer, and outputs the multiplexed data.

Further, in step S26, the controller 35 controls the MUX 32 to insert information on the position, size, etc. of the preferred range into appended information selected as the multiplexed data, and then goes to step S23.

In step S23, the transmission unit 33 sends the multiplexed data output from the MUX 32 along with frame rate information via the transmission line, and then the procedure returns to step S21.

For the simplicity of the explanation, it is assumed here that in step S26, encoded data for display of image data in the third layer are continuously selected for an image outside the preferred range, for example, a background image, as in step S22. In this case, in the controller 35, the amount of the multiplexed data in step S26 will be larger by an image with a higher spatial resolution inside the preferred range, that is, image data in the second layer for the object image, than in step S22.

At this time, even if it is intended to display an image at a rate of for example 30 frames/sec, since the transmission rate of the transmission line permits to display only the image data in the third layer, the multiplexed data including the data in the second layer, acquired in step S26, will not be such data as permits to display an image at the rate of 30 frames/sec.

In this case, the transmission unit 33 will send multiplexed data whose rate is lower than 30 frames/sec or is 0 frame/sec in an extreme case, namely, a still image. Thus, at the receiver 2, there will be displayed an image included in the preferred range and whose horizontal and vertical spatial resolutions are a half of those of their initial image (image in the first layer), that is, an image (image in the second layer) whose horizontal and vertical spatial resolutions are double those of a third layer image having so far been displayed. At this time, however, the time resolution of an image displayed at the receiver 2 will be less than 30 frames/sec.

After data in the second layer for an image inside the preferred range are sent as in the above, if it is judged in step S21 that clock data has been sent from the receiver 2 as in the above, namely, when the user continuously operates the clock data input unit 24 to designate a focus of interest identical to or near the preceding one, the focus of interest identical to or near the preceding one is recognized in step S24, and the same preferred range as the preceding one is set in step S25, and the procedure goes to step S26. Thereby, in step S26, the controller 35 will control the MUX 32 to select and multiplex encoded data so that an image inside the preferred range can be displayed with a higher spatial resolution at the receiver 2.

Since the encoded data of images in the third and second layers and information appended to the images are preferentially selected for the image inside the preferred range as in the above, the encoded data of images in the first layer and information appended to the images are also preferentially selected and multiplexed. The high-resolution information is inserted into the appended information as having been described with respect to step S26, and the multiplexed data from the MUX 32 are sent along with the frame rate information from the transmission unit 33 via the transmission line in step S23, and then the procedure returns to step S21.

In this case, the receiver 2 will display an image included in the preferred range and whose spatial resolution is the same as that of their initial image (image in the first layer), that is, an image (image in the first layer) whose horizontal and vertical spatial resolutions are 4 times higher than those of a fourth layer image displayed first. However, an image whose time resolution is lower than the 30 frames/sec or is 0 frame/sec in an extreme case is handled as a still image.

With the above operations, since data intended for improvement of the spatial resolution of an image inside the preferred range including a focus of interest, namely, an interesting area such as an object image, are preferentially sent if the user of the receiver 2 continuously operates the click data input unit 24 to designate for example the same focus of interest, that is, an interesting area, the spatial resolution of the image inside the preferred range including the focus of interest is gradually improved with the result that the image in the preferred range will be displayed more definitely. That is, an interesting area being an image of a portion the user of the receiver 2 is interested in, for example, an object image, will be displayed more definitely.

As in the above, since image data sending is controlled so that the spatial resolution or time resolution of an interesting area being an image within a preferred area localized with a focus of interest which is based on click data, such as an object image, is changed within a resolution range corresponding to the transmission rate of a transmission line, an image corresponding to a focus of interest, sent at a limited transmission rate, can be displayed at the receiver 2 with a higher spatial resolution. That is, by improving the spatial resolution of an object image inside a preferred range at the sacrifice of the time resolution of the image, the object image, even when sent at the limited transmission rate, can be displayed at the receiver 2 more definitely, namely, with a higher spatial resolution.

Next, the reception processor 21 included in the receiver 2 shown in FIG. 4 will be described in further detail below with reference to FIG. 10.

Figure 10:
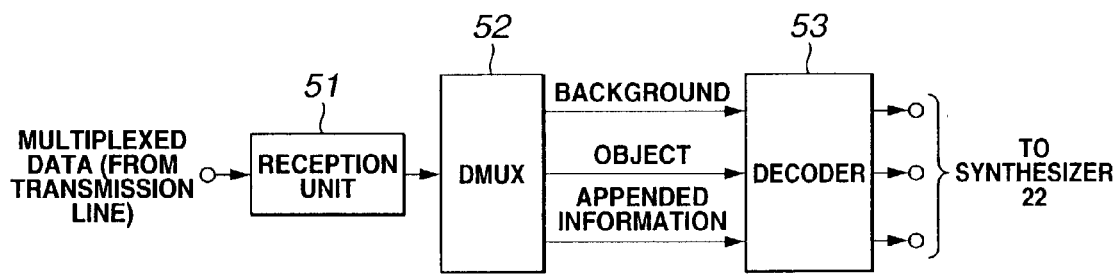
FIG. 10 is a block diagram of the reception processor included in the receiver in FIG. 4.

As shown in FIG. 10, the multiplexed data supplied via the transmission line are received and modulated by a reception unit 51, and then supplied to a demultiplexer (DMUX) 52.

The DMUX 52 demultiplexed the multiplexed data supplied from the reception unit 51 into background encoded data, object encoded data and appended information encoded data, and supplies these encoded data to a decoder 53.

Reversely following the encoding-compression procedure, the decoder 53 decodes the encoded data of background, object or appended information (data derived from encoding of the difference in this embodiment) to their respective initial data, and outputs it to the synthesizer 22 shown in FIG. 4.

Figure 11:
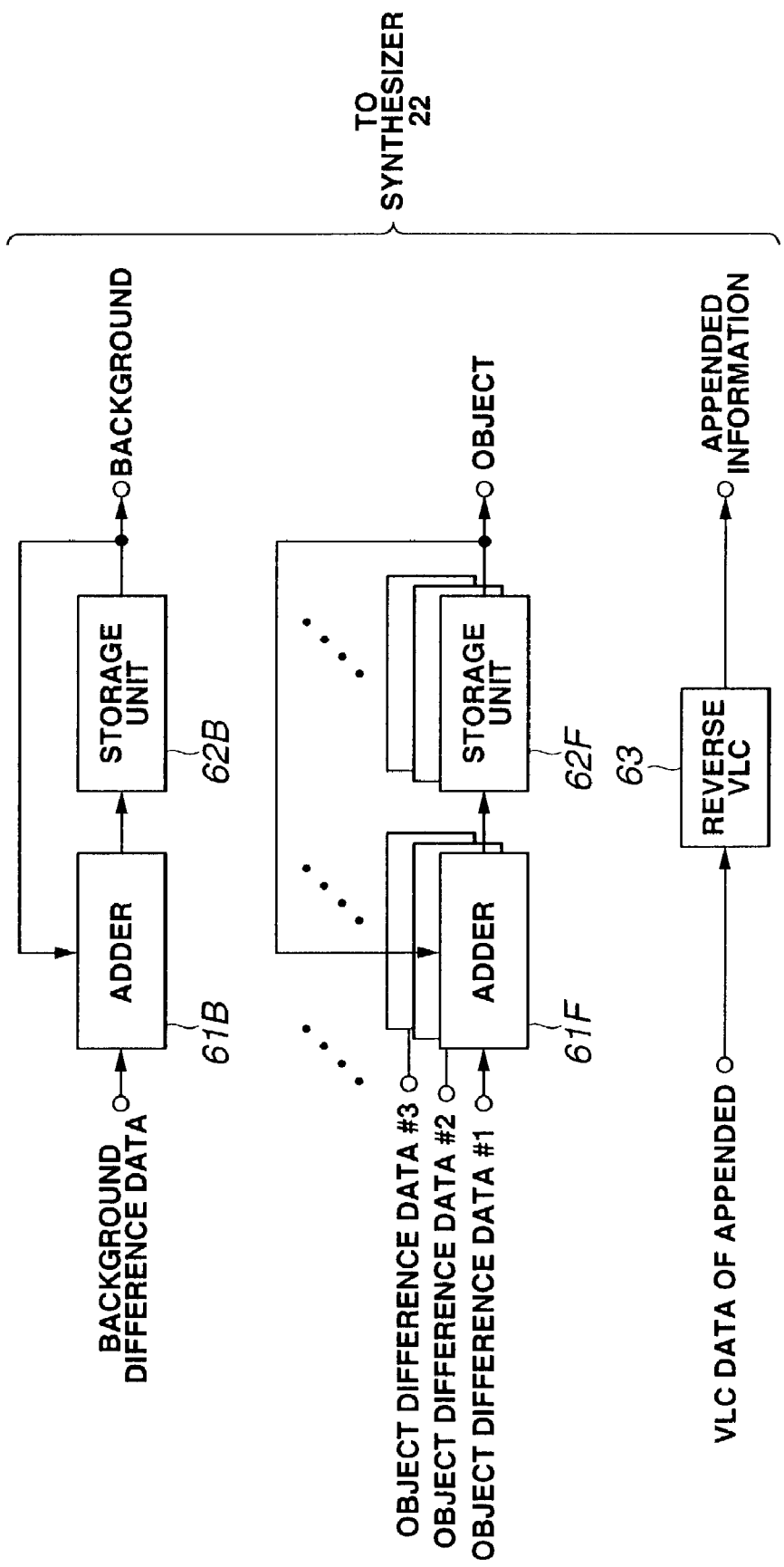
FIG. 11 is a block diagram of the decoder included in the reception processor in FIG. 10.

FIG. 11 shows in detail the decoder 53 in FIG. 10.

As shown in FIG. 11, the hierarchically encoded background image difference data being background encoded data are supplied to an adder 61B which is also supplied with background image data preceding by one frame the background encoded data, stored in a storage unit 62B and already decoded. The adder 61B adds, to the supplied background image difference data, the background image data one frame before the difference data, supplied from the storage unit 62B, to thereby decode background image data in a layer required for the current frame. The decoded background image data are supplied to and stored in the storage unit 62B, and then read and supplied to the adder 61B while being sent to the synthesizer 22 in FIG. 4.

The hierarchically encoded object image difference data being object encoded data are supplied to an adder 61F which is also supplied with object image data one frame before the difference data, stored in a storage unit 62F and already decoded. By adding, to the supplied object image difference data, object image data one frame before the difference data, supplied from th storage unit 62F, the adder 61F decodes object image data in a layer required for the current frame. The decoded object image data are supplied to and stored in the storage unit 62F, and then read and supplied to the adder 61F while being sent to the synthesizer 22 in FIG. 4. Note that when there is a plurality of objects, the adder 61F and storage unit 62F will repeat the above-mentioned hierarchical decoding for the difference data of the plurality of objects.

The above-mentioned variable length-encoded appended information being appended information encoded data are supplied to a reverse VLC (variable-length coder) unit 63 where they are variable length-decoded to their initial appended information. The initial appended information is supplied to the synthesizer 22.

Note that the local decoder 44B in FIG. 7 is constructed similarly to the adder 61B and storage unit 62B and the local decoder 44F is also constructed similarly to the adder 61F and storage unit 62F.

Next, the synthesizer 22 included in the receiver 2 shown in FIG. 4 will be described in detail below with reference to FIG. 12.

Figure 12:
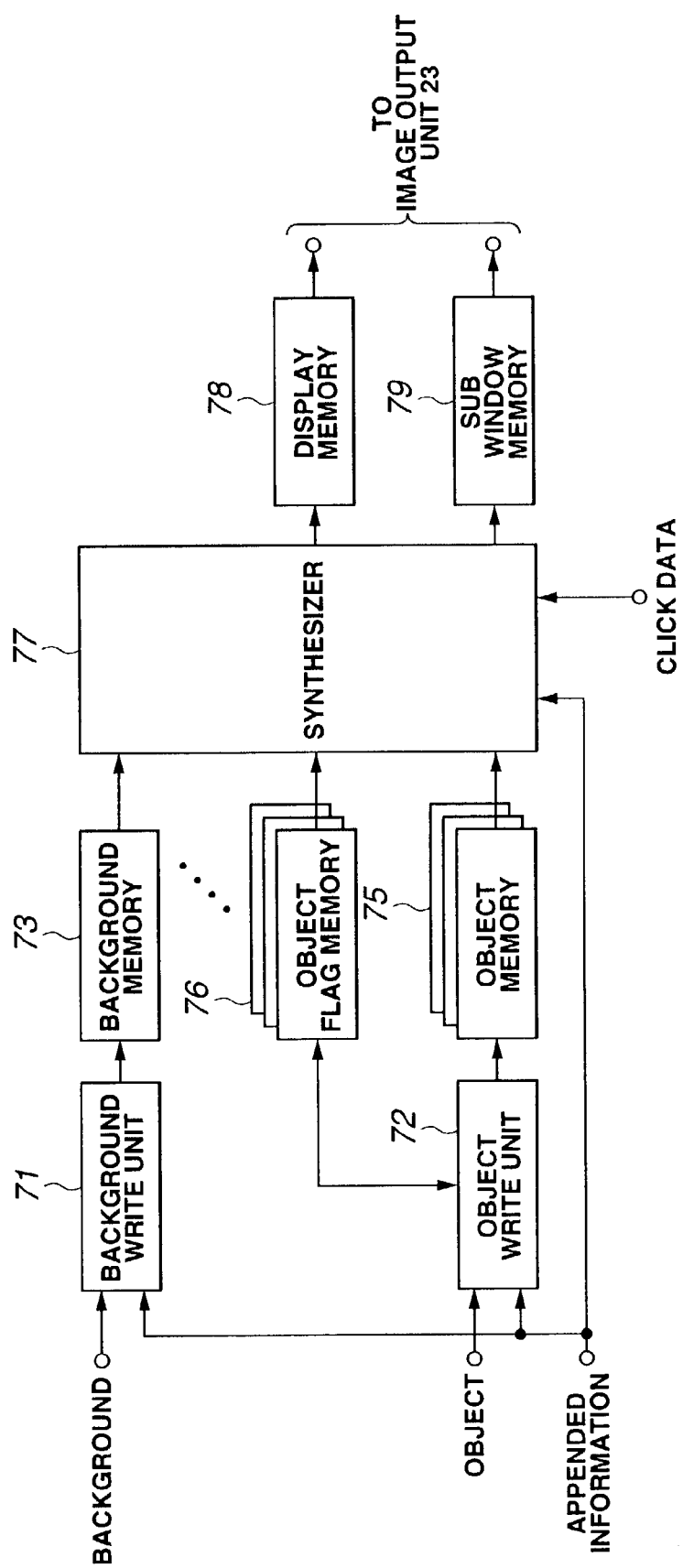
FIG. 12 is a block diagram of the synthesizer of the receiver in FIG. 4.

As shown in FIG. 12, from the decoder 53 in FIG. 10, background image data are supplied to a background write unit 71, object image data are supplied to a object write unit 72, and appended information is supplied to a background write unit 71, object write unit 72 and a synthesizer 77.

The background write unit 71 writes the supplied background image data one after another to the background memory 73. In case there is for example a movement of the background, due to a panning or tilting during imaging by the video camera 6 in the transmitter 1, the background write unit 71 will write the background image data to the background memory 73 with the background being positioned based on a background movement vector included in the appended information. Therefore, the background memory 73 can store data on an image spatially wider than one frame of image.

The object write nit 72 will write the supplied object image data one after another to the object memory 75. Note that in case there is for example a plurality of objects, the object write unit 72 will write image data of the plurality of objects to the object memory 75 for each object. Also, for write of image data of objects having the same object number which will further be described later, namely, same object data, the object write unit 72 will write, to the object memory 75, new object image data, namely, object image data newly supplied to the object write memory 72 in place of object image data already stored in the object memory 75.

Further, when an object whose spatial resolution is high have been written to the object memory 75, the object write unit 72 will change, from "0" to "1", the object flag stored at an address in an object flag memory 76 correspondingly to each of pixels forming the object in consideration. More specifically, when writing object image data to the object memory 75, the object write unit 72 will make reference to the object flag memory 76. No object image data whose spatial resolution is low will be written to the object memory 75 having already stored therein an object whose flag is "1", namely, image data of an object whose spatial resolution is high. Therefore, basically, each time object image data are supplied to the object write unit 72, they are written to the object memory 75; however, no object image data whose spatial resolution is low will be written to the object memory 75 having already stored therein object image data whose spatial resolution is high. As a result, in the object memory 75, each time object image data whose spatial resolution is high are supplied to the object write unit 72, the number of object images whose spatial resolution is high will be larger.

The synthesizer 77 reads a background image of a current frame to be displayed at the present from the background image data stored in the background memory 73 based on the background movement vector included in the appended information while pasting, to the background image, the object image stored in the object memory 75 based on the object movement vector included in the appended information, whereby an image in the current frame is reproduced and supplied to a display memory 78.

Further, upon reception of click data from the click data input unit 24 in FIG. 4, the synthesizer 77 reads, from the object memory 75, object image data containing a coordinate position of a focus of interest included in the click data, and supplies the data to the sub window memory 79.

There is further provided a display memory 78 as a so-called VRAM (video read-only memory) to buffer or provisionally store an image in the current frame supplied from the synthesizer 77 and then read it out for supply to the image output unit 23 in FIG. 4. Also, the sub window memory 79 provisionally stores object image data supplied from the synthesizer 77 and then reads it for supply to the image output unit 23 in FIG. 4. At this time, the display unit 7 driven by the image output unit 23 will display, along with the image in the current frame, a sub window which will further be described later, and display an object image in the sub window.

Figure 13:
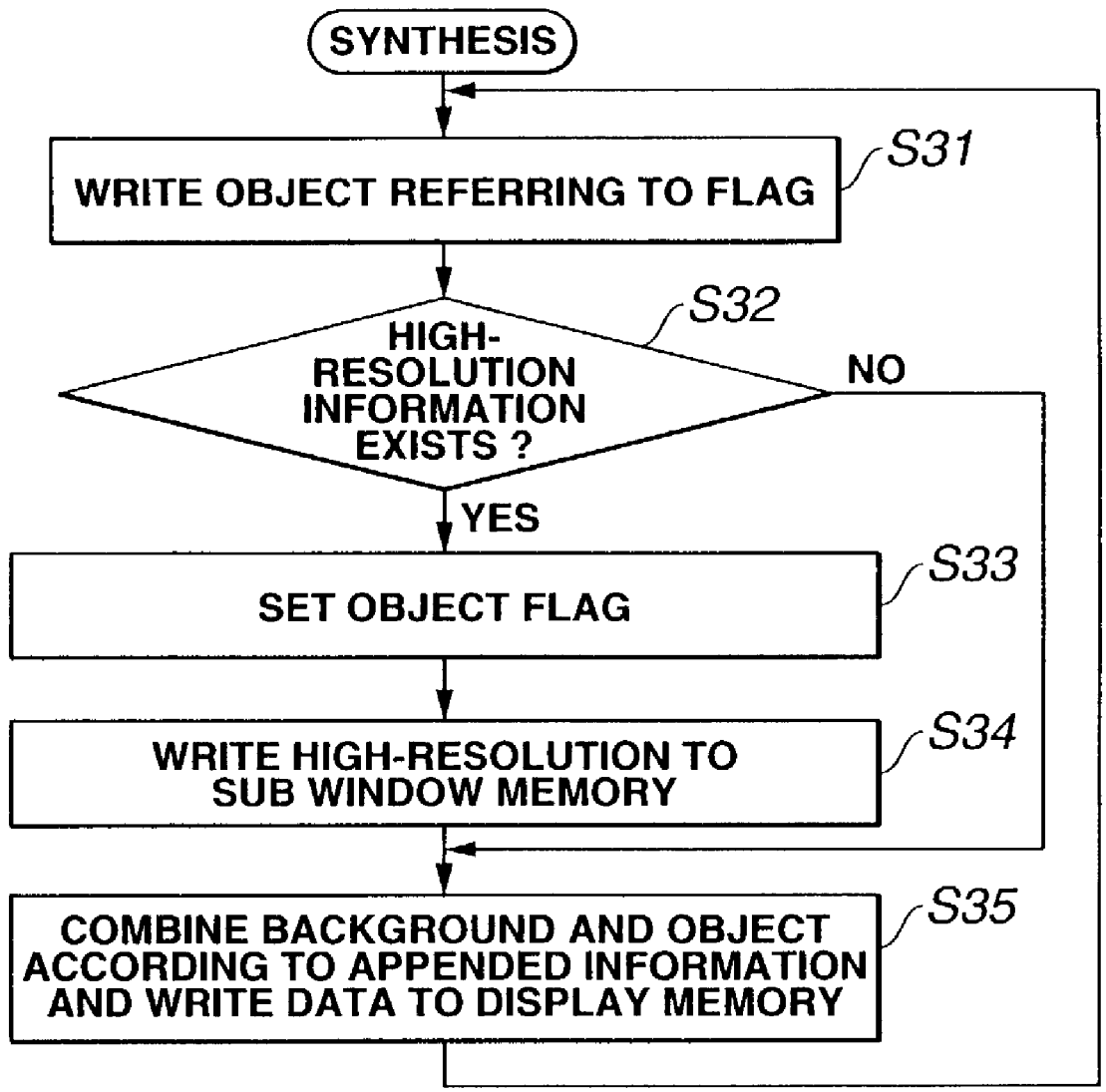
FIG. 13 shows a flow of operations made in the synthesizer in FIG. 12.

Next, the operations effected in the synthesizer 22 in FIG. 12 will be described below with reference to the flow chart in FIG. 13.

First in step S31, the object write unit 72 writes the object image data supplied from the decoder 53 in FIG. 10 as in the above on the basis of an object flag stored in the object flag memory 75.

More particularly, referring to the object flag stored in the object flag memory 76, the object write unit 72 writes object image data supplied thereto at an address, in the object memory 75, corresponding to a pixel for which the object flag is "0", and only object image data supplied thereto and whose spatial resolution is high at an address, in the object memory 75, corresponding to a pixel for which the object flag is "1".

Note that when object image data are written at an address, in the object memory 75, where object image data are already stored, they will be written over the existing object image data in the object memory 75.

Thereafter in step S32, the object write unit 72 judges whether the appended information includes high-resolution information. If it is judged in step S32 that the appended information includes high-resolution, namely, when click data are sent to the transmitter 1 by operating the clock data input unit 24 in FIG. 4 by the user of the receiver 2 and thus object image data whose spatial resolution is high are sent for an image inside the preferred range from the transmitter 1, the object write unit 72 goes to step S33 where it will set a predetermined object flag in the object flag memory 76 to "1".

That is, when object image data whose spatial resolution is high are sent for the image inside the preferred range from the transmitter 1, they are written to the object memory 75 in step S31. Thus in step S33, the object flag for pixels included in an object image whose spatial resolution is high is set to "1".

Thereafter the procedure goes to step S34 where the synthesizer 77 will read object image data inside the preferred range from the object memory 75, and write them to the sub window memory 79.

Namely, when it is judged in step S32 that the appended information includes high-resolution, click data have been sent to the transmitter 1 by operating the clock data input unit 24 in FIG. 4 by the user of the receiver 2 and thus object image data whose spatial resolution is high have been sent for an image inside the preferred range from the transmitter 1. The click data supplied to the transmitter 1 are also supplied to the synthesizer 77. Upon reception of the click data, the synthesizer 77 will recognize, in step S34, the preferred range from the coordinate of the focus of interest an clicked time included in the click data, read an object, sent from the transmitter 1, included in the preferred range and having a high spatial resolution, from the object memory 75, and write the data to the sub window memory 79.

Then in step S35, the synthesizer 77 reads, based on the background movement vector included in the appended information, background image data in the current frame from the background image data stored in the background memory 73, reads object image data to be displayed in the current frame from the object memory 75, and further combines the background image data in the current frame and object image data read from the object memory 75 according to the object movement vector included in the appended information. Thus, the synthesizer 77 reproduces the image in the current frame and writes it to the display memory 78. That is, the synthesizer 77 writes the background image data to the display memory 78 for example, and then writes the object image data over the background image data, thereby writing, to the display memory 78, the image data in the current frame obtained by combining the background image and object image.

As in the above, the image data in the current frame written to the display memory 78, and object image data written to the sub window memory 79 will be supplied to the image output unit 23 in FIG. 4 and displayed on the display unit 7.

On the otherhand, if it is judged in step S32 that the appended information includes no high-resolution information, namely, when the click data input unit 24 has not been operated by the user of the receiver 2, the procedure skips over steps S33 and S34 to step S35 where the synthesizer 77 will read the background image data in the current frame from the background memory 73 and necessary object image data from the object memory 75, to combine the background image in the current frame and object image read from the object memory 75 according to the appended information. Thus, the synthesizer 77 reproduces image data in the current frame and writes them to the display memory 78. Then the procedure returns to step S31 and similar operations will be repeated.

With the above operations for the synthesis, when the user of the receiver 2 has not operated the click data input unit 24, that is, when no clicking has been made at the click data input unit 24, an image whose spatial resolution is low will be displayed on the display screen of the display unit 7 with a default time resolution as shown in FIG. 14A. Note that FIG. 14A shows an example in which an object image whose spatial resolution is low is being moved rightward over a background image whose spatial resolution is low.

When the user of the receiver 2 moves the cursor over the object image by operating the click data input unit 24 and clicks with the cursor on the object image, click data is sent to the transmitter 1 and the transmitter 1 receives data intended for display, as a high spatial-resolution image, of an image inside a preferred range localized based on the click data by the sacrifice of the time resolution. As the result, there will be displayed on the display screen of the display unit 7, as shown in FIG. 14B, an image corresponding to an object image included in the preferred range around the clicked position and whose time resolution is low but whose spatial resolution is gradually improved. That is, an image is displayed which corresponds to an object image included in the preferred range and whose spatial resolution is gradually improved correspondingly to a time when clicking has been made on the image.

Further, on the display unit 7, the sub window is opened and an image corresponding to an object in an extracted preferred range including a clicked position is displayed in the sub window with the spatial resolution of the object being gradually improved, as shown in FIG. 14B.

Thereafter, when the user of the receiver 2 stops clicking with the click data input unit 24, the synthesizer 77 reads background image data in the current frame from the background memory 73 and object image data from the object memory 75, combines the background image data and object image data according to the appended data, and writes the data to the display memory 78, in step S35 as having been described above. As in the above, since the object image data whose spatial resolution has been elevated by clicking is continuously stored as it is in the object memory 75, the object image whose spatial resolution has thus been improved by clicking is moved according to the appended information movement vector is displayed in a due position in the current frame on the display unit 7 as shown in FIG. 14C.

Therefore, by clicking in a position where an object image whose detail is to be observed, the user of the receiver 2 will be able to view an object image having an improved spatial resolution. Thus, the user will be able to view a detailed image of an object.

Note that since the background image data is stored in the background memory 73 as in the above, the transmitter 1 has not to send any background sent once and whose spatial resolution is low. Therefore, the transmission rate for the background can be allocated preferentially to sending of object image data whose spatial resolution is higher.

In the above case, the object image data having the spatial resolution raised by clicking is stored in the object memory 75 and the object image having the high spatial resolution is pasted on the background image after the clicking is stopped. Thus, the object image displayed at the receiver 2 will have a high spatial resolution but will not reflect any change in state of an object image picked up at the transmitter 1.

So, with the object flag being disregarded after the clicking is stopped, the object image data stored in the storage unit 62F in the decoder 53 shown in FIG. 11 can be written over the object image data stored in the object memory 75 and whose spatial resolution is high. That is, since object image data sent from the transmitter 1 are stored one after another into the storage unit 62F of the decoder 53, the object image in an image displayed on the display unit 7 will be made to reflect a change in state of the object captured at the transmitter 1 as in the above by writing the object image data to the object memory 75. However, the displayed object image will have a low spatial resolution.

Next, the relation between the spatial and time resolutions of an image sent from the transmitter 1 to the receiver 2 via the transmission line will be described below with reference to FIG. 15.

Assume here that the transmission rate of the transmission line is R [bps] and a background image and data including three objects #1 to #3 are sent from the transmitter 1. For the simplicity of the explanation, no consideration will be given to the appended information, and it is assumed that for displaying the background image and object images #1 to #3 with a certain spatial resolution, the same data amount is required for each of the images.

In this case, when no clicking has been made at the receiver 2, the transmitter 1 will send the background image and object images #1 to #3 each at a rate R/4 [bps] being a quarter of the transmission rate of the transmission line, as shown in FIG. 15A. Note that when the ordinary time resolution is 1/T frame/sec, the transmitter 1 will send one frame of each of the background image and object images #1 to #3 in a maximum of T sec. Therefore in this case, there will be displayed on the receiver 2 background image and object images #1 to #3 each having a spatial resolution of T×R/4 bits/frame.

When the user clicks at a time $t_1$ and in a position of the object image #1 for example, the transmitter 1 will stop sending the background image and object images #2 and #3 for example while sending only the object image #1 at the full transmission rate R of the transmission line, as shown in FIG. 15A. Thereafter, when the user stops clicking at a time $t_2$ which is later by a time 4T than the time $t_1$, the transmitter 1 will send the background image and object images #1 to #3 again at a transmission rate of R/4.

Therefore, while the user is clicking, 4T×R bits of the object #1 are sent. So, when the time resolution during clicking is 0 frame/sec, the receiver 2 will display the object image #1 with a spatial resolution of 4T×R bits/frame. That is, when the horizontal and vertical spatial resolutions have been improved to the same extent, the time resolution at the receiver 2 is 0 frame/sec but the object image #1 clicked by the user will be displayed with horizontal and vertical spatial resolutions 4 times higher than those before clicking (= $\sqrt{4T \times R/(T \times R/4 \text{ bits})}$)).

Thus, the spatial resolution can be improved at the sacrifice of the time resolution, and the spatial resolution of object image the user is interested in can be improved more rapidly than when the time resolution is sacrificed.

In an example shown in FIG. 15A, while the object image #1 is being clicked, a transmission rate of 0 frame/sec is set for sending the background image and other object images #2 and #3 so that these data will not be sent. In an example shown in FIG. 15B, however, a high transmission rate may be allocated for sending the object image #1 while a low transmission rate may be allocated for sending the background image and object images #2 and #3.

Even if the clicking is made, the transmission rate allocated for sending the background image and object images #1 to #3 can be kept as R/4. That is, since the spatial resolution is improved at the sacrifice of the time resolution, sending of the data takes a time even without allocating any other transmission rate.

In the above, object image having the spatial resolution elevated by clicking is stored in the object memory 75, and after the clicking is stopped, the object image having the high spatial resolution is pasted on the background image. However, where the high spatial-resolution object image is to be pasted on the background image depends upon an object movement vector included in the appended information on the object, sent from the transmitter 1 later.

Therefore, since the receiver 2 has to recognize an object image in a frame, corresponding to an image in a frame adjacent to the former frame, the object extraction unit 14 of the transmitter 1 appends information intended for use by the receiver 2 to make such a recognition for extraction of an object.

Next, in the pre-processor 12 of the transmitter 1, it is possible to extract an interesting object image and detect when the user's interest has shifted to another area, based on click data supplied from the receiver 2, that is, designation data from the user.

The first embodiment of the image processor according to the present invention and operations thereof will be described herebelow. Note that in this embodiment, there will be described, by way of example, the extraction of an interesting area and detection of shift of the user's interest to another area, based on the designation data from the user, effected at the transmitter 1 of the system shown in FIG. 1.

Figure 16:
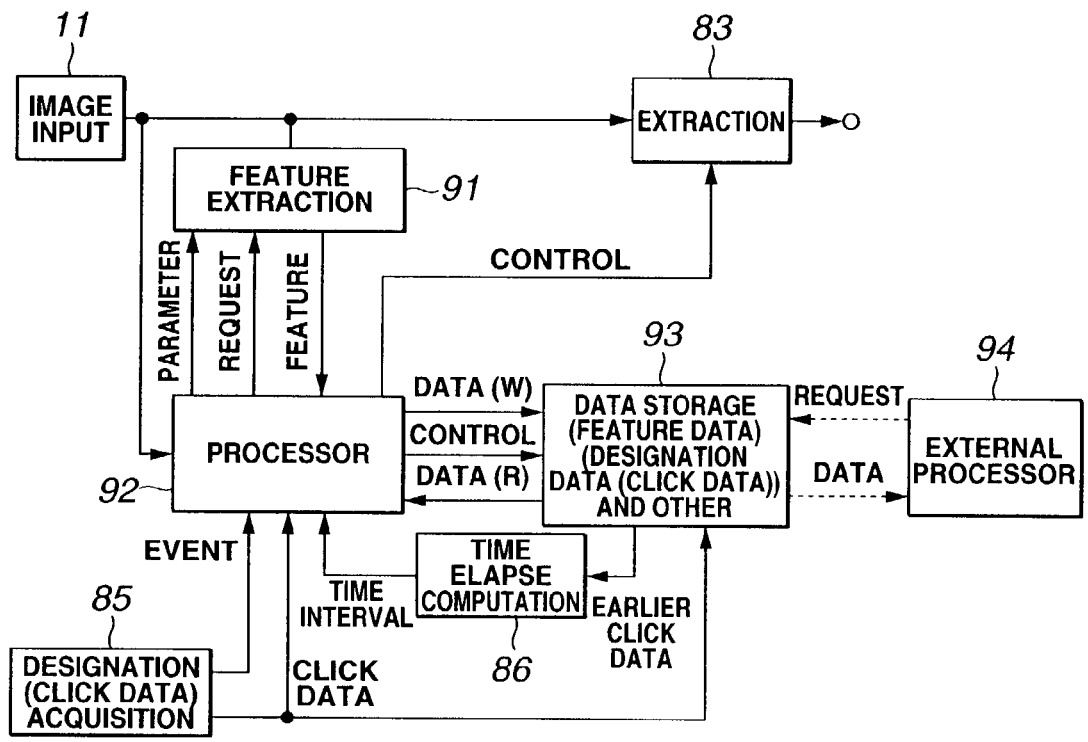
FIG. 16 is a block diagram of the object extraction unit included in the transmitter shown in FIG. 2 to extract an object based on click data.

FIG. 16 shows the first embodiment of the image processor according to the present invention, in which the object extraction unit 14 of the pre-processor 12 shown in FIG. 2 extracts an object image (interesting area) the user of the receiver 2 is interested in from a captured image on the basis of the click data sent from the receiver 2.

The image processor shown in FIG. 16 receives a designation data (clock data) given by the user of the receiver 2, for example, clicking an image while viewing the image, and extracts an object from the image based on the click data.

By storing not only click data supplied from the user of the receiver 2 and based on which an object is extracted (will be referred to as "current click data" hereunder wherever appropriate) but click data already supplied at various earlier times and using the stored click data and current click data, it is possible to predict a demand from the user. The "click data" referred to herein include clicked-position information and clicking-time information.

However, since click data having simply been stored will be averaged, their significance will gradually be lower. Therefore, to accurately predict a user's demand, it will be necessary to extract only click data required currently, that is, significant click data, from the stored click data.

To extract only significant ones of the stored click data, features of a plurality of objects are compared with each other and significant click data are extracted based on the result of comparison. Namely, the dominance of each of the stored click data is judged and an object is extracted with the use of dominant click data. In other words, object images produced based on click data from the user are coupled or uncoupled to be more appropriate objects according to the features of the object image data to reconstruct the original images, namely, the dominance of the click data is judged according to predetermined features of the object image data and object images are reconstructed through the coupling or uncoupling to correspond to the click data judged to be more dominant. However, the method of comparing the features varies depending upon how the click data from the user are used.

For reconstruction of an object image, the small objects corresponding to the click data are possibly coupled to each other incorrectly or an object image is possibly divided into incorrect small objects. According to the image processing algorithm used in this embodiment, however, the appropriateness of the coupling or division of small object image data is verified according to a predetermined one of the plurality of features of the object image data, whereby the coupling or division is effected appropriately to produce object image data, thereby providing an object image.

This embodiment of the image processor processes an image in units of object image data reconstructed with the use of the predetermined feature of each small object image data, thereby permitting to extract more appropriate object images.

The predetermined feature of each small object image data is for example a movement of the small object in relation to the object image data. Namely, the problem in coupling or division of the above-mentioned small object images is a so-called tracking. When an object image is pasted while being tracked, the plurality of small object images which can be considered to be integral with each other should show the same movement as a feature. Therefore, when for example two small object images show the same movement, they may be taken as belonging to the same object and may be coupled to each other. On the other hand, if the two small object images show different movements, processing them as belonging to the same object image will cause an inconsistency between them and so the two small object image have to be taken as independent of each other.

Thus, by coupling small object images showing the same movement to each other, so to speak, making a rigid-body movement, because they belong to the same object while uncoupling small object images showing different movements, it is possible to make consistent coupling or division and thus use object image data optimally.

As in the above, more appropriate object images can be extracted by extracting object images using the click data from the user of the receiver 2 and reconstructing object image through coupling or division of objects according to a predetermined feature, namely, movement, of the object images.

Further, a shift of the user's interest to another image area can be detected based on an inter-click time interval which is a time interval between designation data from the user of the receiver 2.

That is, the analytical experiments have already provided that when the user sees an image, he or she sees each somewhat meaningful image area of the image. In this embodiment of the system according to the present invention, when the user wants an improved quality of image data he is interested in, he will click the interesting image area. When an object image can be extracted correctly, an image of a high quality can be presented very effectively. However, an incorrect extraction of an object image will lead to a failure of image quality improvement, rather, to an image quality degradation. Particularly, when the user's interest shifts to another image area, an object image to be improved in quality will be changed from an object image in which the user has so far been interested in to a new object image the user is currently interested in. Therefore, when the user's interest shifts to another image area, it will be a problem how the shift of the user's interest should be detected.

To solve the above problem, this embodiment measures a time interval between click data which are designations from the user of the receiver 2 based on the fact that the time required for continuously designating an area the user is interested in is shorter than that for designating another area to which the user's interest shifts, to thereby permitting to detect the shift of the user's interest to the other area.

FIG. 16 shows the object extraction unit to attain the above.

As shown in FIG. 16, the object extraction unit includes an image input unit 11 corresponding to the image input unit 11 shown in FIG. 2. The image input unit 11 includes for example a video camera, video input terminal, etc. It acquires image data at every predetermined times and send them to a feature extraction unit 91, extraction unit 83 and a processor 92.

The object extraction unit further includes a designation acquisition unit 85 which acquires click data from the user of the receiver 2 and sends, to the processor 92, click data from the user and a signal indicating that a click being a signal indicative of an input event made by the user has been has been entered. The click data from the designation acquisition unit 85 is sent to a time elapse computation unit 86 via a data storage unit 93, and also stored into the data storage unit 93.

The time elapse computation unit 86 makes comparison between the current click data supplied from the designation acquisition unit 85 and the earlier click data stored in the data storage unit 93 to compute a time interval between the earlier and current click data. More particularly, the time elapse computation unit 86 computes a time interval between the click data supplied from the user of the receiver 2 from the clicking-time information included in each click data. The time-interval data computed by the time elapse computation unit 86 are sent to the processor 92.

The processor 92 controls operations of all the component blocks of the object extraction unit.

Supplied with a click input event from the designation acquisition unit 85, the processor 92 will determine small object images corresponding to the click data supplied along with the input event, and judges, based on the time interval data from the time elapse computation unit 86 and earlier click data read from the data storage unit 93, whether user of the receiver 2 has shifted his interest to another object image.

If the processor 92 judges, since for example the time elapse data does not exceed a predetermined threshold, that the user has not shifted his interest to any other object image, it will use earlier click data store din the data storage unit 93 appropriately to determine an object image. Namely, the processor 92 will take, as belonging to the same object image, and couple, to each other, a small object image selected based on the current click data supplied from the designation acquisition unit 85 and a small object image being an object image having been selected based on the earlier click data or an object image being a collection of small object images. That is, the processor 92 will regard the small object image corresponding to the current click data as belonging to an object image corresponding to the earlier click data, and store the same identifier information as that appended correspondingly to the earlier click data along with position and time information on the current click data into the data storage unit 93 correspondingly to the earlier click data.

On the other hand, if the processor 92 judges, since the time interval data exceeds the predetermined threshold, that the interest of the user of the receiver 2 has shifted to another object image, it will select an object image correspondingly to a newly entered click data, not to any earlier click data stored in the data storage unit 93. Namely, the small object image selected correspondingly to the current click data supplied from the designation acquisition unit 85, and an object image having been selected correspondingly to the earlier clock data, that is, a small object image or an object image being a collection of small object images, will be taken as being different from each other, and will not be coupled with each other. That is to say, the processor 92 will regard the small object image corresponding to the current click data as belonging to an object image not corresponding to the earlier click data, and will store the identifier information different from that appended correspondingly to the earlier click data along with the position and time information on the current click data into the data storage unit 93 correspondingly to the current click data.

The processor 92 will store coupling information indicative of whether object images are to be coupled with each other or not into the data storage unit 93. These information corresponds to the above identifier information.

Also, supplied with a click input event from the designation acquisition unit 85, the processor 92 will select an object image and send a feature extraction requesting signal for extraction of a predetermined feature of the object image data, predetermined parameters concurrently corresponding to the click data, for example, position data indicative of an object for example, etc. to the feature extraction unit 91.

In response to the feature extraction requesting signal supplied from the processor 92, the feature extraction unit 91 will extract a movement being a predetermined feature of each small object image from the image data correspondingly to position data etc. being parameters sent along with the request signal and used for computation of a movement of an object corresponding to an object image, and send the extracted object feature data to the processor 92. Then processor 92 will store the feature data on each small object image data into the data storage unit 93 correspondingly to the small object image data. That is, data storage unit 93 will store the feature data correspondingly to click data corresponding to the small object image data.

On the other hand, when no click input event is supplied from the designation acquisition unit 85, the processor 92 will send a feature extraction requesting signal for requesting to extract a feature of each small object image data and parameters for extraction of a feature of each small object image data to the feature extraction unit 91 at a predetermined time point. Thus, the feature extraction unit 91 will extract each object image data corresponding to the predetermined time point from the image data, and supply feature data of each small object image data, extracted at the predetermined time points, to the processor 92. The feature data of each small object image data will be stored in the data storage unit 93 correspondingly to the small object image data. That is, the data storage unit 93 stores feature data correspondingly to click data corresponding to the small object image data.

Note that the feature extraction unit 91 will compute different features depending on whether a click input event is supplied or not as in the above but the unit 91 may be adapted to compute the same features. Also, the data storage unit 93 can send data stored therein upon request from an external processor 94.

Further, when no click input event is supplied from the designation acquisition unit 85, the processor 92 judges the appropriateness of the current feature data according to the feature data on each of small object image data acquired at the above time points and feature data on each small object image data already stored to check if the characteristic of the current feature data has been changed from the earlier one, and also judges, based on the result of checking, whether the small object image data are to be coupled with, or uncoupled from, each other. If the data characteristic is found changed, the processor 92 will update or erase information on the coupling and uncoupling of small object images, stored in the data storage unit 93, that is, the coupling and uncoupling information.

That is, when supplied with no click input event from the designation acquisition unit 85, the processor 92 will make comparison between feature data of the small object image data, extracted at different time points, and those of the small object image data already stored, and judge, based on the result of comparison, whether the plurality of small object images are to be coupled to or uncoupled from each other.

More particularly, in case for example two small object images show the same movement (feature), the processor 92 will judge that the two small object images are to be coupled to each other. On the other hand, when the two small object images are different in movement from each other, the processor 92 will judge that the two small object images should be left not coupled to each other and taken as being independent of each other.

When the processor 92 judges that the two small object images should be coupled to each other, it will store coupling information indicating that the small object images should be coupled to each other as one of to-be-stored data into the data storage unit 93. If the two objects have already been coupled to each other, the coupling information is maintained as it is. The coupling information is the aforementioned identifier information.

Also, concerning small object images judged to be independent of each other, the processor 92 will store uncoupling information indicating that they are independent of each other as one of to-be-stored data into the data storage unit 93. Note that when the two small object images are already known as independent of each other, the uncoupling information is maintained as it is.

On the other hand, if two small object images having been judged to belong to the same object image and coupled to each other thereafter show different movements, the processor 92 will judge that they should be uncoupled from each other. Thus, when the processor 92 judges that two object images having initially belonged to the same object should be uncoupled from each other, it will erase, from the data storage unit 93, the coupling information that the two small object images are to be coupled to each other, and update the uncoupling information that the small object images should be taken as independent of each other.

As in the above, the processor 92 selects objects and decides whether they should be coupled to or uncoupled from each other, based on click data supplied from the designation acquisition unit 85, earlier click data stored in the data storage unit 93 and inter-click time interval data supplied from the time elapse computation unit 86, and judges whether the objects should be coupled to or uncoupled from each other according to the feature (movement) of each object image.

The processor 92 sends, to an extraction unit 83, a control signal for extraction of the objects selected as in the above from image data. That is, the processor 92 has the image data supplied thereto from the image input unit 11, determines positions and shapes of the objects from the image data, and sends signals indicative of the object positions and shapes to the extraction unit 83.

The extraction unit 83 has image data supplied thereto from the image input unit 11, and extracts object images from the image data based on signals indicatives of the positions and shapes of the objects from the processor 92. The extracted object image data are delivered at the object extraction unit 14 of the pre-processor 12 in FIG. 2.

Next, the flow of operations made in the object extraction unit in FIG. 16 will further be described with reference to the flow chart in FIG. 17.

Figure 17:
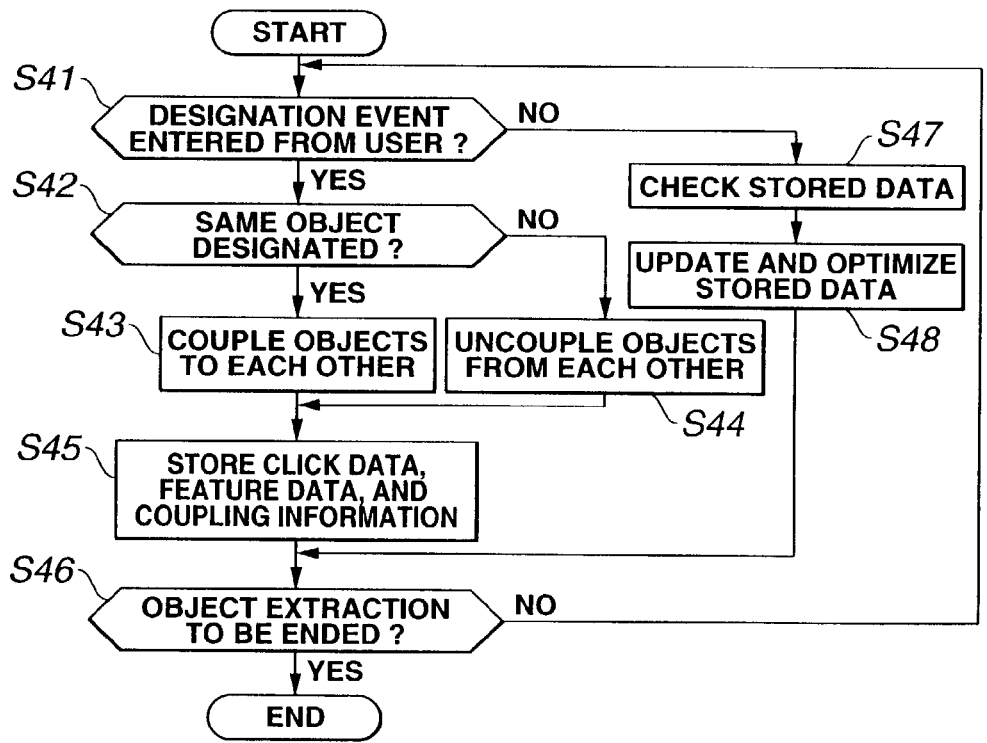
FIG. 17 shows a flow of operations made in the object extraction unit shown in FIG. 16.

In step S41 in FIG. 17, the designation acquisition unit 85 detects whether a designation event, that is, a click input event, has been sent from the user of the receiver 2. If the result of judgment is that the click input event has been sent, the designation acquisition unit 85 sends a signal indicative of the fact to the processor 92. Receiving the signal, the processor 92 judges whether the click input event being a designation event from the user of the receiver 2 has been made. When it is judged that the event has been supplied, the processor 92 goes to step S42. If the judgement is that no event has been supplied, the processor 92 goes o step S47.

In step S42, the processor 92 judges, based on the time interval data from the time elapse computation unit 86 and earlier click data from the data storage unit 93, whether the user of the receiver 2 designates the same object. That is, when the time interval data exceeds a predetermined threshold, the processor 92 will judge that the user of the receiver 2 has shifted his interest to another object image and the user has clicked the other object image, and go to step S44. On the other hand, when the time interval data does not exceed the predetermined threshold, that is, when the time interval data is less than the threshold, the processor 92 judges that the user of the receiver 2 is still interested in the same object image and the user has clicked the same object image, and goes to step S43.

In step S43, the processor 92 will make the full use of the earlier clock data stored in the data storage unit 93 to select object images, namely, take the small object images corresponding to the current click data supplied from the designation acquisition unit 85 as belonging to the same object image selected based on the earlier click data to couple them to each other.

On the other hand, in step S44, the processor 92 will use newly entered clock data, not the earlier click data stored in the data storage unit 93, to select an object image. That is, the processor 92 will take the small object image corresponding to the current click data supplied from the designation input unit 85 as being different from the object image having been selected based on the earlier clock data, and do not couple them.

After completion of the operations in steps S43 and S44, the processor 92 controls the data storage unit 93 to store the click data and coupling and uncoupling information of each of the small object images.

In step S47 to which the processor 92 has gone because of the judgment in step S41 that no designation input event has been supplied from the user of the receiver 2, the processor 92 will have the feature extraction unit 91 extract features of small object images at various time points, and use the features of the small object images stored in the data storage unit 93 to check if the characteristic of the feature data has been changed. Based on the result of checking, the processor 92 will judge whether the small object images should be coupled to or uncoupled from each other.

Next, in step S48, the processor 92 optimizes (update and erase) the coupling and uncoupling information on the small object images stored in the data storage unit 93 and which have been judged in step S47 to have the characteristic thereof changed.

More specifically, if the two small object images have the same features (movement), the processor 92 will store the coupling information for coupling the two small object images to each other, as one of to-be-stored data, into the data storage unit 93. Note that, when the two small object images have already been coupled to each other, the processor 92 will maintain the coupling information as it is. On the other hand, if two small object images initially taken as belonging to the same object are found to show different movements, the processor 92 will uncouple the two coupled small object images from each other, and erase the coupling information of each of the small object images from the data storage unit 93 and updates the information to uncoupling information.

After completion of the operations in steps S48 and S45, the processor 92 will send signals indicative of positions and shapes of the objects to the extraction unit 83, and judges in step S46 whether the extraction is to be ended or not. When the result of judgment is that the extraction is not to be ended, the processor 92 returns to step S41.

Next, the operation in step S42 in FIG. 17 will further be described with reference to the flow chart shown in FIG. 18.

Figure 18:
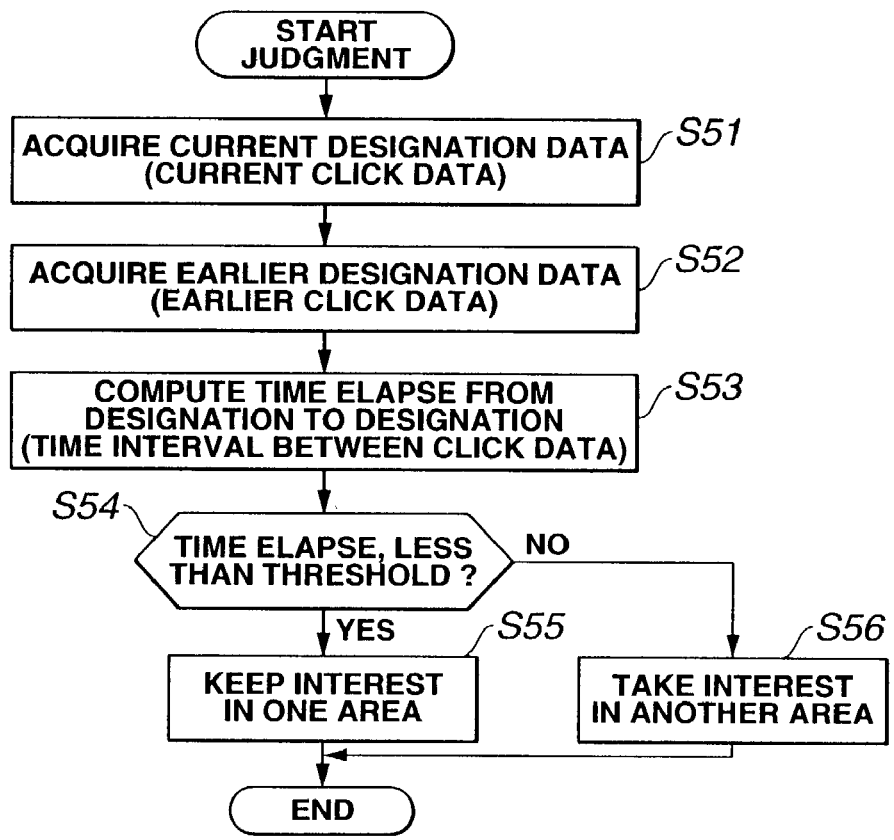
FIG. 18 shows, in detail, the flow of operations made in step S42 in the object extracting procedure in FIG. 17.

After arrival at step S42 in FIG. 17, the processor 92 first goes to step S51 in FIG. 18 where it will control the designation acquisition unit 85 to acquire current click data and send the click data to the time elapse computation unit 86 via the data storage unit 93. Then in step S52, the time elapse computation unit 86 will acquire earlier click data from the data storage unit 93. Assume here that the click data includes position information indicative of the position of a clicked image and time information indicative of a time when the image is clicked. Further in step S53, the time elapse computation unit 86 computes an inter-click time interval rom the time information in the current click data from the designation acquisition unit 85 and time information in the earlier clock data from the data storage unit 93, and sends the time interval data to the processor 92.

In step S54, the processor 92 will judge, based on the time interval data from the time elapse computation unit 86, whether the time interval is less than the threshold. When the judgment is that the time interval is less than the threshold, the processor 92 judges, in step S55 corresponding to step S43, that the interest of the user of the receiver 2 has not shifted to any other object image but still stays in the same object image and generates identifier information for small object images corresponding to the current click data. That is, the identifier information (coupling information) appended to each of the plurality of small object images indicates whether the plurality of small object images belongs to the same object image. For the small object images in which, it is judged, the user of the receivers 2 is still interested, there are stored into the data storage unit 93 the position and time information on the small object images (click data), to which the same identifier information as that for the small object images clicked in the past is appended. On the other hand, when the time interval exceeds the threshold, the processor 92 will judge in step S56 corresponding to step S44 that the user of the receiver 2 has shifted his interest to another object image, append identifier information different from that for the small object images clicked in the past to the other object image and store the position and time information on the small object images (click data) into the data storage unit 93.

Next, the flows of the operations in steps S47 and S48 in FIG. 17 will further be described with reference to FIG. 19.

Figure 19:
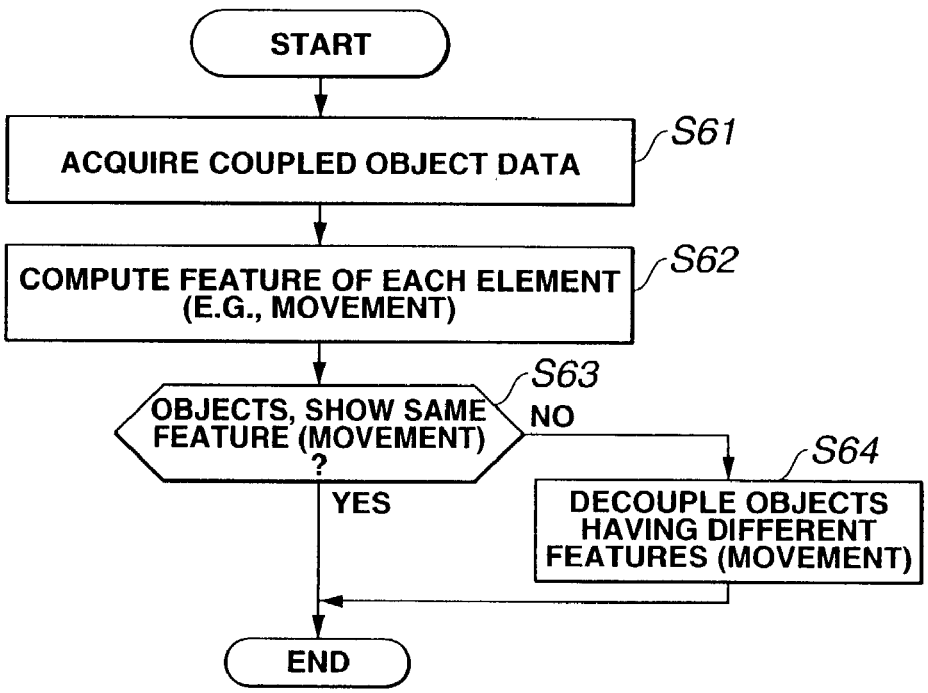
FIG. 19 shows, in detail, the flow of operations made in step S47 in the object extracting procedure in FIG. 17.

After arrival at step S47 in FIG. 17, the processor 92 first goes to step S61 in FIG. 19 where it will acquire information on coupling of objects stored in the data storage unit 93. That is, in the data storage unit 93, the same identifier information or the like is appended to a plurality of small object images to indicate that the plurality of small object images belongs to the same object image.

Next, in step S62, the feature extraction unit 91 is controlled by the processor 92 to detect features of the small object images (elements) and send the feature data to the processor 92.

Receiving the feature data, the processor 92 judges in step S63 whether the small object images show the same feature, namely, a movement within a certain range. If the result of judgment is that the small object images show the same feature, the processor 92 will store the coupling information on the two small object images into the data storage unit 93. In case the two small object images are already coupled to each other, the processor 92 will keep the coupling information unchanged. That is, the processor 92 will not change the identifier information appended to each of the small object images (click data). This operation corresponds to that in step S48.

On the other hand, if the judgment made in step S63 is that the two small object images show different features, the processor 92 will go to step S64 where it will take the two small object images as being different from each other and uncouple them from each other. For example, in case two objects initially belonging to the same object image have shown different movements, the processor 92 will uncouple, in step S64, the two small object images from each other, then erase, in step S48, the coupling information on the small object images from the data storage unit 93 and update the information to uncoupling information. That is, a new identifier information is appended to small object images (click data) having been judged to have different features. This operation corresponds to that in step S48.

Figure 20:
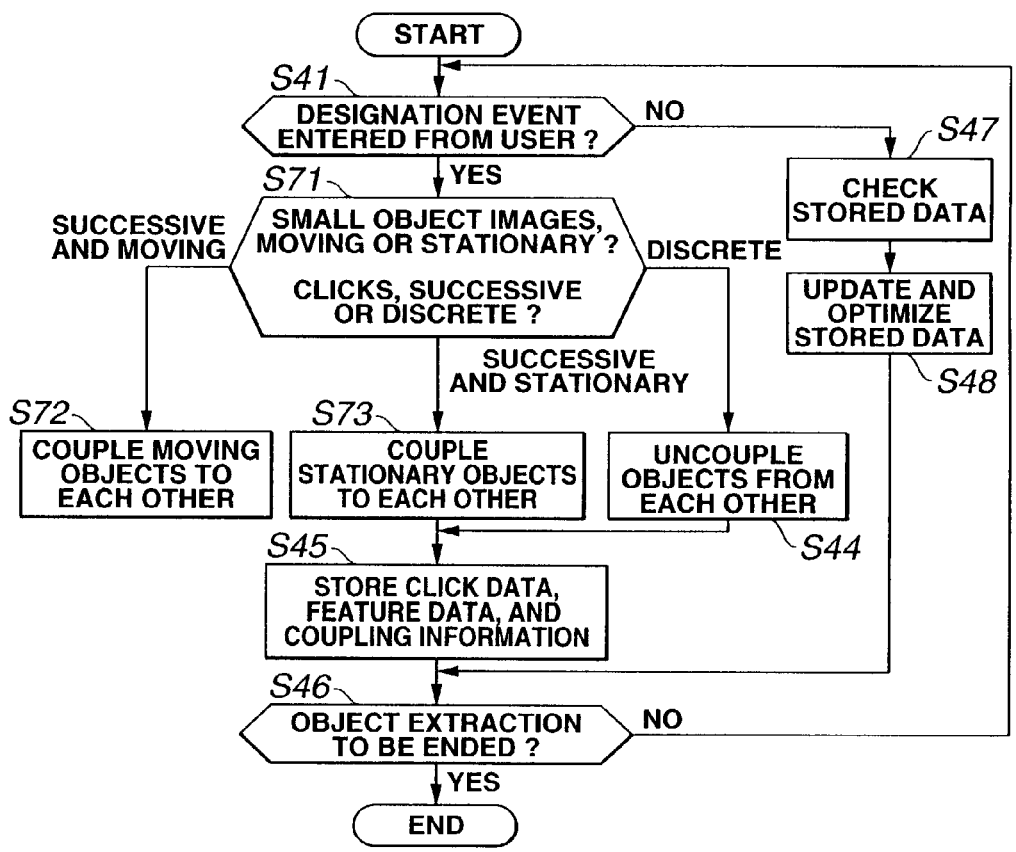
FIG. 20 shows another example of the flow of operations made in the object extraction unit shown in FIG. 16.

In the object extraction unit shown in FIG. 16, the flow of operations as will be shown in FIG. 20 may be done in place of that shown in FIG. 17. Note that in FIG. 20, the same steps of operation as those in FIG. 17 are indicated with the same references as in FIG. 17, and will not be described any longer. Only operations different from those in FIG. 17 will be described below.

As shown in FIG. 20, when it is judged in step S41 that a designation event has been entered by the user, the processor 92 will go to step S71.

In step S71, the processor 92 judges whether small object images corresponding to the click data sent from the receiver 2 are moving or stationary ones and whether the clicks are successive or discrete. More particularly, when a difference between frames of the small object images is smaller than a predetermined threshold, the processor 92 will judge that the objects in the small object images are stationary. In case the difference is greater than the threshold, the processor 92 will judge that the objects are moving ones. Further, if the inter-click time interval is shorter than a predetermined time, the processor 92 will judge that the clicks are successive. If it is judged in step S71 that the small object images corresponding to earlier click data are stationary object images, current click data are successive clicks and the small object images corresponding to the current click data are stationary object images, the processor 92 goes to step S73 where it will take the stationary objects are the same and couple the small object images to each other by assimilating identifier information corresponding to the current small object images to identifier information corresponding to the earlier object images. Further, if it is judged in step S71 that the small object images corresponding to the earlier click data are moving objects, current click data are successive clicks and the small object images corresponding to the current click data are moving objects, the processor 91 goes to step S72 where it will take the moving objects are the same and couple them by assimilating identifier information corresponding to the earlier small object images to identifier information corresponding to the current object images. On the other hand, if it is judged in step S71 that the current click data are discrete ones or if it is judged in the same step that the small object images corresponding to the earlier click data are moving and stationary, respectively, the processor 92 goes to step S44 where it will take the objects as being different from each other and uncouple them by dissimilating the identifier information corresponding to the current small object images from the identification information corresponding to the earlier small object images. After completion of the operations in these steps S72, S73 and S44, the processor 92 goes to step S45.

As in the above, it is possible to accurately localize an area (object) the user is interested in, that is, to couple objects which should be coupled to each other and uncouple objects which should be uncoupled from each other, as well as to detect even an area to which the user's interest has shifted.

In the foregoing, the application of the object extraction unit shown in FIG. 16 to the communication system shown in FIG. 1 has been described by way of example. Note however that the aforementioned object extraction and detection of an area the user is newly interested in can of course be applied to various other applications of extraction of an interesting area from an image and detection of another area to which the user's interest has shifted as well as to the communication system in FIG. 1. For example, the object extraction unit shown in FIG. 16 can be constructed independently and can be applied to all systems for extraction of an area the user is interested in, coupling small areas to each other or uncoupling small areas once coupled to each other, and also for detection of another area to which the user's interest has shifted. Also, the features detected from the object images may include, in addition to the movement, brightness histogram, standard deviation, deformation or color of images.

The above series of operations can be done by a hardware or software. In case the operations are to be done by a software, programs forming together the software is installed in a computer incorporated in the transmitter 1 and receiver 2 as dedicated hardware, a genera-purpose computer, or the like.

Here will be described a recording medium having the program for doing the series of operations recorded therein and used to install the program into a computer and enable them to be executed by the computer.

The program for effecting the above series of operations can be pre-recorded in a hard disc or semiconductor memory as a recording medium incorporated in a computer. The program may be stored (recorded) provisionally or permanently in recording medium such as a floppy disc, CD-ROM (compact disc read-only memory), MO (magneto-optical) disc, DVD (digital versatile disc), magnetic disc or a semiconductor memory.

Note that the program can be installed from the above-mentioned recording medium to a computer or it can be wirelessly transferred from a download site to a computer via a digital-broadcasting artificial satellite or via a network such as LAN (local area network) or Internet and installed into a hard disc incorporated in the computer.

Also note that the steps for description of the program for various operations may not always be done on the time series in a description sequence in a flow chart but may include operations which are effected in parallel or individually (for example, parallel operations or object-based operations).

An example construction of a computer for executing the program under the aforementioned series of operations are effected will be described with reference to FIG. 21.

Figure 21:
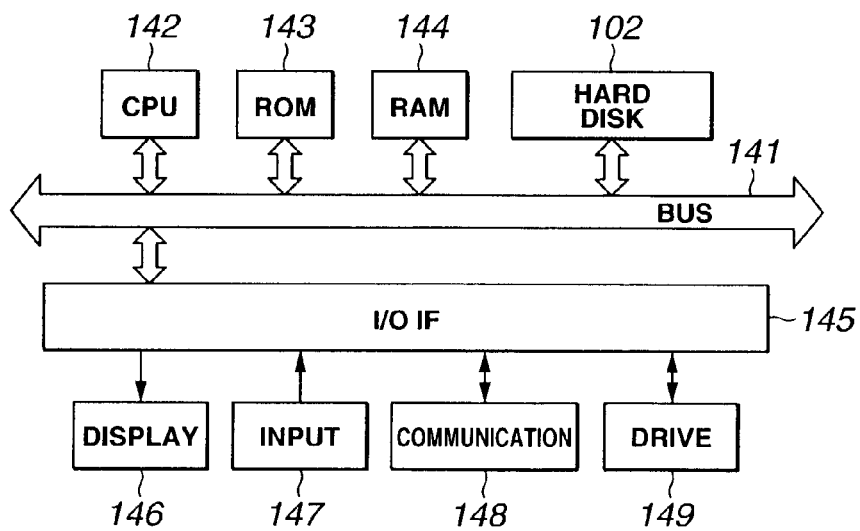
FIG. 21 is a block diagram of the computer according to the present invention.

The computer shown in FIG. 21 incorporates a CPU (central processing unit) 142. An input/output interface 145 is connected via a bus 141 to the CPU 142. When supplied with an instruction from the user operating an input unit 147 including a keyboard, mouse and the like via the input/output interface 145, the CPU 142 will execute a program stored in a ROM (read-only memory) 143 corresponding to the above-mentioned semiconductor memory. Also, the CPU 142 will load, into a RAM (random-access memory) 144, and execute, a program stored in the hard disc 102, a program transferred from the satellite or network, received by a communication unit 148 and installed in the hard disc 102 or a program read out from a floppy disc, CD-ROM, MO disc, DVD or magnetic disc provided in a drive 149 and installed in the hard disc 102. Then the CPU 142 outputs the result of execution of the program to a display unit 146 composed of an LCD (liquid crystal display) or the like via the input/output interface 145 for example.

According to the present invention, the time and spatial resolutions of an image displayed at the receiver 2 are changed by hierarchically encoding the image data at the transmitter 1 and selecting and sending data in a hierarchical layer. Alternatively, the time resolution and spatial resolution of an image displayed at the receiver 2 can be changed by making discrete cosine conversion of the image to select a degree of coefficient or quantizing the image to change the quantizing step in the transmitter 1, for example.

Also, the time and spatial resolutions can also be changed by using another image encoding method in the transmitter 1. That is, for displaying for example an object image (interesting area) at an ordinary time resolution, the profile of the image may be chain-encoded, a mean value of pixels (color) of the object image be determined as a representative value and the data be subject to an entropy encoding such as Huffman encoding, in the transmitter 1, while the inside of the object image area may be painted in a color as the representative value in the receiver 2. For displaying an image at an improved spatial resolution, it is possible to use the hierarchical encoding as having previously been described.

In the above embodiment, the spatial resolution of an image is improved. On the contrary, the time resolution of the image can be improved.

Also in the above embodiment, the spatial resolution of a preferred range as an area of an image is improved, but the spatial resolution of the entire image can also be improved.

Further, in the above example, an image is divided into a background and object before being processed. However, the image may be processed without being so divided.

Besides, the present invention is applicable to image data as well as to sound data. For example, the present invention can be applied to extraction of sound features such as sound pitch, desired part of human voice, characteristic sounds of musical instruments, etc. based on a certain basic frequency included in sound signal.

INDUSTRIAL APPLICABILITY

According to the present invention, image data corresponding to designation data from the user are coupled to each other to group them, features of image data corresponding to the designation data, and the image data coupled once to each other are uncoupled according to the features of the image data in a group, to thereby accurately localize an area in which the user is interested in. Also, according to the present invention, a time interval between designation data is computed, and image data are coupled when the computed time interval is less than a predetermined threshold but not coupled when the time interval exceeds the predetermined threshold, whereby it is possible to detect another area to which the user's interest has shifted.

The invention claimed is:

1. An image processor comprising:
    means for acquiring designation data from the user;
    means for coupling image data corresponding to the designation data to form a group corresponding to an object;
    means for detecting a feature of the image data corresponding to the designation data; and
    means for uncoupling the image data, within the group coupled by the coupling means corresponding to the designation data, according to each feature of image data corresponding to the designation data .

2. The apparatus according to claim 1, further comprising:
    means for dividing the image data into small areas;
    wherein the coupling means couples the small areas of the image data to each other to group them according to the designation data;
    wherein the feature detecting means detects a feature of each of the small areas; and
    wherein the uncoupling means uncouples the small areas having been coupled by the coupling means from each other according to the features of the small areas in the same group.

3. The apparatus according to claim 2, further comprising:
    means for storing, for each of the small areas, information on positions of designation data corresponding to the small areas in the image data, designation-time information and identifier information indicative of whether each of the small areas belongs to any object image;
    wherein the coupling means couples small areas corresponding to earlier designation data and small areas corresponding to current designation data to each other by storing the same identifier information as identifier information corresponding to the earlier designation data stored in a storage means so as to correspond to the small areas corresponding to the current designation data; and
    wherein the uncoupling means uncouples, when one of a plurality of small areas to which the same identifier information is appended by the coupling means is different in feature from other small areas, the one and other small areas from each other by changing the identifier information of the one small area to different one of the other small areas.

4. The apparatus according to claim 3, wherein
    the feature detecting means detects, as the feature, the movement of an object in image data in interesting small areas in interesting image data of moving image data consisting of a plurality of image data.

5. The apparatus according to claim 4, further comprising:
    means for computing a time interval between designation data earlier than the designation-time information on the designation data and current designation data; and
    wherein the coupling means couples the small areas to each other when the time interval computed by the time interval computing means is less than a predetermined threshold while storing, when the time interval exceeds the predetermined threshold into the data storing means, different identifier information from identifier information corresponding to the earlier designation data information correspondingly to the current designation data no1 to couple the small areas corresponding to the earlier designation data and those corresponding to the current designation to each other.

6. The apparatus according to claim 1, wherein
    the feature detecting means judges whether objects in interesting small area image data corresponding to the interesting image data are stationary or moving, based on a difference between the interesting small area image data and peripheral image data adjacent in the direction of time to the interesting small area image data; and
    the coupling means is adapted to:
    store, when the small area image data corresponding to the earlier designation data are stationary objects, the interesting small area image data are judged to be stationary and the time interval computed by the time interval computing means is less than the predetermined threshold, the same identifier information as the identifier information corresponding to the earlier designation data stored in the storing means into the storing means correspondingly to the small areas corresponding to the current designation data to couple the small areas corresponding to the earlier designation data and those corresponding to the current designation data to each other;
    store, when the small area image data corresponding to the earlier designation data are moving objects, the interesting small area image data are judged to be moving and the time interval computed by the time interval computing means is less than the predetermined threshold, the same identifier information as the identifier information corresponding to the earlier designation data stored in the storing means into the storing means correspondingly to the small areas corresponding to the current designation data to couple the small areas corresponding to the earlier designation data and those corresponding to the current designation data to each other; and store, when the time interval exceeds the predetermined threshold or when the result of the stationary/moving judgment of the small area image data corresponding to the earlier designation data is different from that of the small area image data corresponding to the current designation data, identification information different from the identifier information corresponding to the earlier designation data into the data storing; means correspondingly to the current designation data not to couple the small areas corresponding to the earlier designation data and those corresponding to the current designation data to each other.

7. A communication apparatus for sending image data, comprising:
an input means to which image data are supplied continuously;
means for receiving time-spatial position designation data for the image data;
means for coupling image data corresponding to the received designation data to form a group corresponding to an object;
means for detecting a feature of each of the image data corresponding to the designation data; and
means for uncoupling the image data whiting the group, coupled by the coupling means and corresponding to the designation data, according to each of the features of the designation data.

8. The apparatus according to claim 7, further comprising:
means for dividing the image data into small areas;
wherein the coupling means couples the small areas of the image data to each other to group term according to the designation data;
wherein the feature detecting means detects a feature of each of the small areas; and
wherein the uncoupling means uncouples the small areas, having been coupled by the coupling means, according to the features of the small areas in the same group.

9. The apparatus according to claim 8, further comprising:
means for storing, for each of the small areas, information on positions of designation data corresponding to the small areas in the image data, designation-time information and identifier information indicative of whether each of the small areas belongs to any object image;
wherein the coupling means couples small areas corresponding to earlier designation data and small areas corresponding in current designation data to each other by storing the same identifier information as identifier information corresponding to the earlier designation data stored in a storage means so as to correspond to the small areas corresponding to the current designation data; and
wherein the uncoupling means uncouples, when one of a plurality of small areas to which the same identifier information is appended by the coupling means is different in feature from other small areas, the one and other small areas from each other by changing the identifier information of the one small area to different one of the other small areas.

10. The apparatus according to claim 9, wherein the feature detecting means detects, as the feature, the movement of an object in image data in interesting small areas in interesting image data of moving image data consisting of a plurality of image data.

11. The apparatus according to claim 10, further comprising:
means for computing a dine interval between designation data earlier than the designation-time information on the designation data and current designation data; and
wherein the coupling means couples the small areas to each other when the time interval computed by the time interval computing means is less than a predetermined threshold while storing, when the time interval exceeds the predetermined threshold into the data storing means, different identifier information from identifier information corresponding to the earlier designation data information correspondingly in the current designation data not to couple the small areas corresponding to the earlier designation data and those corresponding to the current designation to each other.

12. The apparatus according to claim 11, wherein
the feature detecting means judges whether objects in interesting small area image data corresponding to the interesting image data are stationary or moving, based on a difference between the interesting small area image data and peripheral image data adjacent in the direction of time to the interesting small area image data; and
the coupling means is adapted to:
store, when the small area image data corresponding to the earlier designation data are stationary objects, the interesting small area image data are judged to be stationary and the time interval computed by the time interval computing means is less than the predetermined threshold, the same identifier information as the identifier information corresponding to the earlier designation data stored in the storing means into the storing means correspondingly to the small areas corresponding to the current designation data to couple the small areas corresponding to the earlier designation data and those corresponding to the current designation data to each other;
store, when to small area image data corresponding to the earlier designation data are moving objects, the interesting small area image data are judged to be moving and the time interval computed by the time interval computing means is less than the predetermined threshold, the same identifier information as the identifier information corresponding to the earlier designation data stored in the storing means into the storing means correspondingly to the small areas corresponding to the current designation data to couple the small areas corresponding to the earlier designation data and those corresponding to the current designation data to each other; and
store, when the time interval exceeds the predetermined threshold or when the result of the stationary/moving judgment of the small area image data corresponding to the earlier designation data is different from that of the small area image data corresponding to the current designation data, identification information different from the identifier information corresponding to the earlier designation data into the data storing means correspondingly to the current designation data not to couple the small ureas corresponding to the earlier designation data and those corresponding to the current designation data to each other.

13. An image processing method comprising the steps of:
acquiring designation data;
coupling image data corresponding to the designation data to form a group corresponding to an object;
detecting a feature of the image data corresponding to the designation data; and
uncoupling the image data within the group, coupled by the coupling step and corresponding to the designation data, according to each feature of image data corresponding to the designation data.

14. A communication method for sending image data, comprising the steps of:
inputting image data continuously;
receiving time-spatial position designation data for the image data;

coupling image data corresponding to the received designation data to form a group corresponding to an object;

detecting a feature of each of the image data corresponding to the designation data; and uncoupling the image data within the group, coupled by the coupling step and corresponding to the designation data, according to each of the features of the designation data.

15. A computer readable storage medium having provided there a computer executable program which can be read by an information processing means, the program comprising the steps of:

acquiring designation data;

coupling image data corresponding to the designation data to form a group corresponding to an object;

detecting a feature of the image data corresponding to the designation data; and uncoupling the image data within the group, coupled by the coupling step and corresponding to the designation data, according to each feature of image data corresponding to the designation data.

16. A computer readable storage medium having stored therein a computer executable program which can be read by an information processing means, the program comprising the steps of:

inputting image data continuously;

receiving time-spatial position designation data for the image data;

coupling image data corresponding to the received designation data to form a group corresponding to an object;

detecting a feature of each of the image data corresponding to the designation data; and uncoupling the image data within the group, coupled by the coupling step and corresponding to the designation data, according to each of the features of the designation data.

17. An image processor apparatus comprising:

an acquisition unit configured to acquire designation data;

a coupling unit configure to couple image data corresponding to the designation data to form a group corresponding to an object;

a detection unit configured to detect a feature of the image data corresponding to the designation data; and an uncoupling unit configured to uncouple the image data within the group, coupled by the coupling unit corresponding to the designation data, according to each feature of image data corresponding to the designation data.

18. A communication apparatus for sending image data, comprising:

an input unit configured to receive image data;

a receiving unit configured to receive time-spatial position designation data for the image data;

a coupling unit configured to couple image data corresponding to the received designation data to form a group corresponding to an object;

a detecting unit configured to detect feature of each of the image data corresponding to the designation data; and an uncoupling unit configured to uncouple the image data within the group, coupled by the coupling unit and corresponding to the designation data, according to each of the features of the designation data.

* * * * *

UNITED STATES PATENT AND TRADEMARK OFFICE
CERTIFICATE OF CORRECTION

PATENT NO. : 7,076,097 B2  Page 1 of 1
APPLICATION NO. : 10/048103
DATED : July 11, 2006
INVENTOR(S) : Kondo et al.

It is certified that error appears in the above-identified patent and that said Letters Patent is hereby corrected as shown below:

Title page, item
(30)   Foreign Application Priority Data

Change:  May 29, 2000   (JP) …….. 2000-159281

To:      May 29, 2000   (JP) …….. 2000-159261

Signed and Sealed this

Twelfth Day of September, 2006

JON W. DUDAS
*Director of the United States Patent and Trademark Office*